US012572143B2

(12) United States Patent
Taylor et al.

(10) Patent No.: US 12,572,143 B2
(45) Date of Patent: Mar. 10, 2026

(54) SYSTEMS, METHODS, AND/OR APPARATUS FOR PROVIDING A USER DISPLAY AND INTERFACE FOR USE WITH AN AGRICULTURAL IMPLEMENT

(71) Applicant: Kinze Manufacturing, Inc., Williamsburg, IA (US)

(72) Inventors: Ryan Taylor, Williamsburg, IA (US); Max Taylor, Williamsburg, IA (US); Jason Schoon, Williamsburg, IA (US); Ryan McMahan, Williamsburg, IA (US); Matthew Moeller, Williamsburg, IA (US); Marshall Yeoman, Williamsburg, IA (US); Kelly Minton, Williamsburg, IA (US); Kyle B. Wetjen, Williamsburg, IA (US); Greg Ryan, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 1021 days.

(21) Appl. No.: 16/420,816

(22) Filed: May 23, 2019

(65) Prior Publication Data

US 2019/0278262 A1    Sep. 12, 2019

Related U.S. Application Data

(63) Continuation of application No. PCT/US2017/064246, filed on Dec. 1, 2017.
(Continued)

(51) Int. Cl.
*G05D 1/00* (2024.01)
*A01B 69/00* (2006.01)
(Continued)

(52) U.S. Cl.
CPC ........... *G05D 1/0016* (2013.01); *A01B 69/00* (2013.01); *A01B 69/004* (2013.01);
(Continued)

(58) Field of Classification Search
CPC .......... G05D 1/0016; G05D 2201/0201; A01C 7/18; G06F 3/04842; G06F 3/0488;
(Continued)

(56) References Cited

U.S. PATENT DOCUMENTS

| | | | | |
|---|---|---|---|---|
| 4,747,301 A | * | 5/1988 | Bellanger | G07C 5/08 |
| | | | | 73/114.53 |
| 4,773,338 A | * | 9/1988 | Hastings | E05G 5/02 |
| | | | | 109/11 |

(Continued)

FOREIGN PATENT DOCUMENTS

| | | | |
|---|---|---|---|
| CN | 207264228 U | * | 4/2018 |
| RU | 2513083 C2 | | 4/2014 |
| RU | 2560210 C2 | | 8/2015 |

OTHER PUBLICATIONS

"Simplicity Australia Topcon X30 Seeder Controller Operator's Manual", TOPCON Precision Agriculture, Jan. 2015, pp. 1-146 (Year: 2015).*

(Continued)

*Primary Examiner* — Matthew Ell
*Assistant Examiner* — David V Luu
(74) *Attorney, Agent, or Firm* — McKee, Voorhees & Sease, PLC

(57) ABSTRACT

A display unit is connected to an agricultural implement to provide inputs and operational controls, as well as status and set up, of the implement. The display unit can be a touchscreen or other device that can receive inputs to set up, control, store information, and recall information associated with the operation of the agricultural implement. The display
(Continued)

unit can provide a number of different types of inputs to allow for the control of the various components of the implement. An alert system can provide tiered alerts, such as based upon the severity of the alerts, to provide for notice to a user as to one or more issues associated with the implement or an operation thereof.

19 Claims, 42 Drawing Sheets

Related U.S. Application Data

(60) Provisional application No. 62/428,725, filed on Dec. 1, 2016.

(51) Int. Cl.

| | |
|---|---|
| *A01B 79/00* | (2006.01) |
| *A01C 7/18* | (2006.01) |
| *G06F 3/04842* | (2022.01) |
| *G06F 3/0488* | (2022.01) |

(52) U.S. Cl.
CPC .............. *A01B 79/005* (2013.01); *A01C 7/18* (2013.01); *G06F 3/04842* (2013.01); *G06F 3/0488* (2013.01)

(58) Field of Classification Search
CPC ....... G06F 3/0481; A01B 49/06; A01B 69/00; A01B 69/004; A01B 79/005
See application file for complete search history.

(56) References Cited

U.S. PATENT DOCUMENTS

| | | | | |
|---|---|---|---|---|
| 5,956,255 | A * | 9/1999 | Flamme | A01C 7/102 |
| | | | | 700/242 |
| 7,756,623 | B2 * | 7/2010 | Jarrett | A01B 63/00 |
| | | | | 701/50 |
| 8,849,523 | B1 | 9/2014 | Chan et al. | |
| 9,538,615 | B1 * | 1/2017 | Armstrong | H05B 47/10 |
| 9,542,063 | B1 * | 1/2017 | Marchant | G06F 11/327 |
| 10,222,941 | B2 * | 3/2019 | Lucas | B60K 35/00 |
| 10,387,100 | B2 | 8/2019 | Markov et al. | |
| 10,567,415 | B2 * | 2/2020 | Doppke | G06F 21/577 |
| 10,580,403 | B2 * | 3/2020 | van der Vlugt | G10L 15/22 |
| 10,765,091 | B2 * | 9/2020 | Miyahara | G06Q 10/06311 |
| 2002/0083695 | A1 | 7/2002 | Behnke et al. | |
| 2003/0033179 | A1 * | 2/2003 | Katz | G06Q 10/0631 |
| | | | | 705/7.41 |
| 2004/0021563 | A1 * | 2/2004 | Mahoney | G06Q 10/08 |
| | | | | 340/684 |
| 2005/0108348 | A1 * | 5/2005 | Lee | H04M 3/42374 |
| | | | | 709/207 |
| 2006/0241837 | A1 | 10/2006 | Jarrett et al. | |
| 2008/0300698 | A1 * | 12/2008 | Havekost | H04L 67/56 |
| | | | | 700/83 |
| 2010/0102948 | A1 | 4/2010 | Grohman et al. | |
| 2010/0305973 | A1 | 12/2010 | McLaren et al. | |
| 2010/0311173 | A1 * | 12/2010 | Baucells Guiteras | G06Q 50/02 |
| | | | | 436/55 |
| 2011/0022267 | A1 * | 1/2011 | Murphy | B60W 50/14 |
| | | | | 701/124 |
| 2011/0296506 | A1 | 12/2011 | Caspi | |
| 2012/0179363 | A1 | 7/2012 | Pierfelice | |
| 2012/0183675 | A1 * | 7/2012 | Reineccius | A01C 1/06 |
| | | | | 709/204 |
| 2012/0189762 | A1 * | 7/2012 | Reineccius | G06Q 10/0631 |
| | | | | 118/696 |
| 2012/0253744 | A1 * | 10/2012 | Schmidt | G01D 7/02 |
| | | | | 702/182 |
| 2013/0008361 | A1 | 1/2013 | Trevino et al. | |

| | | | | |
|---|---|---|---|---|
| 2013/0074481 | A1 * | 3/2013 | Miura | F01N 9/002 |
| | | | | 60/311 |
| 2013/0110357 | A1 * | 5/2013 | Peterson | A01C 21/00 |
| | | | | 701/50 |
| 2013/0144827 | A1 * | 6/2013 | Trevino | A01C 23/007 |
| | | | | 706/46 |
| 2013/0151689 | A1 * | 6/2013 | GanapathyRaj | H04L 41/048 |
| | | | | 709/224 |
| 2013/0207771 | A1 * | 8/2013 | Ersavas | G05B 15/02 |
| | | | | 340/3.1 |
| 2014/0035752 | A1 * | 2/2014 | Johnson | A01B 79/005 |
| | | | | 340/601 |
| 2014/0047323 | A1 * | 2/2014 | Bourke | G06F 9/542 |
| | | | | 715/234 |
| 2014/0053092 | A1 * | 2/2014 | Grevinga | G06F 3/04842 |
| | | | | 715/781 |
| 2014/0108076 | A1 * | 4/2014 | Reineccius | G06Q 10/087 |
| | | | | 705/7.12 |
| 2014/0116735 | A1 | 5/2014 | Bassett | |
| 2014/0189585 | A1 * | 7/2014 | Brush | B60R 16/023 |
| | | | | 715/808 |
| 2014/0277963 | A1 * | 9/2014 | Van Mill | A01D 90/10 |
| | | | | 701/50 |
| 2014/0324272 | A1 * | 10/2014 | Madsen | A01B 69/001 |
| | | | | 701/28 |
| 2014/0325422 | A1 * | 10/2014 | Madsen | A01D 43/087 |
| | | | | 715/771 |
| 2014/0347291 | A1 * | 11/2014 | Katsube | G06F 3/04186 |
| | | | | 345/173 |
| 2015/0004572 | A1 * | 1/2015 | Bomer | G09B 9/042 |
| | | | | 434/219 |
| 2015/0029017 | A1 * | 1/2015 | Thoreson | G08B 5/36 |
| | | | | 340/461 |
| 2015/0051743 | A1 * | 2/2015 | Darnold | A01G 25/16 |
| | | | | 700/284 |
| 2015/0073716 | A1 * | 3/2015 | Johnson | G06Q 50/02 |
| | | | | 702/19 |
| 2015/0127212 | A1 * | 5/2015 | Chacon | B60W 50/14 |
| | | | | 701/32.4 |
| 2015/0199775 | A1 * | 7/2015 | Pfeiffer | G06Q 50/02 |
| | | | | 705/7.42 |
| 2015/0278640 | A1 * | 10/2015 | Johnson | G06T 7/13 |
| | | | | 382/110 |
| 2015/0319913 | A1 * | 11/2015 | Foster | G05D 1/0217 |
| | | | | 701/26 |
| 2016/0073573 | A1 * | 3/2016 | Ethington | A01B 79/005 |
| | | | | 705/7.36 |
| 2016/0078569 | A1 * | 3/2016 | Ethington | G06Q 10/04 |
| | | | | 705/7.37 |
| 2016/0146611 | A1 * | 5/2016 | Matthews | A01B 79/005 |
| | | | | 701/533 |
| 2016/0202227 | A1 * | 7/2016 | Mathur | G06F 30/00 |
| | | | | 702/2 |
| 2016/0224227 | A1 * | 8/2016 | Brush | B60K 35/00 |
| 2016/0291590 | A1 * | 10/2016 | Kuniyasu | G06Q 10/0631 |
| 2016/0299037 | A1 * | 10/2016 | DeVore | G01M 17/00 |
| 2016/0328084 | A1 * | 11/2016 | Barat | G16Z 99/00 |
| 2016/0343231 | A1 * | 11/2016 | Bump | A01B 76/00 |
| 2017/0039786 | A1 * | 2/2017 | DeVore | G07C 5/0816 |
| 2017/0113548 | A1 * | 4/2017 | Lucas | G06F 3/0481 |
| 2017/0129383 | A1 * | 5/2017 | Bika | G01L 5/06 |
| 2017/0160916 | A1 * | 6/2017 | Baumgarten | B60K 35/00 |
| 2017/0261986 | A1 * | 9/2017 | Gerrish | A01B 69/008 |
| 2017/0332544 | A1 * | 11/2017 | Conrad | G06N 20/00 |
| 2017/0354080 | A1 * | 12/2017 | Foster | G06F 9/44505 |
| 2017/0357400 | A1 * | 12/2017 | Foster | G05D 1/0278 |
| 2018/0059691 | A1 * | 3/2018 | Fleming | G06Q 50/02 |
| 2018/0077189 | A1 * | 3/2018 | Doppke | H04L 63/20 |
| 2018/0146612 | A1 * | 5/2018 | Sauder | G01C 21/3407 |
| 2018/0275858 | A1 * | 9/2018 | Zhou | G06F 3/14 |
| 2018/0325050 | A1 * | 11/2018 | Bye | A01G 25/162 |
| 2019/0045751 | A1 * | 2/2019 | Miyahara | G06Q 10/06311 |
| 2019/0059206 | A1 * | 2/2019 | Stanhope | A01B 63/008 |
| 2019/0090432 | A1 * | 3/2019 | Duquette | G06Q 10/04 |
| 2019/0133026 | A1 * | 5/2019 | Seaman | H04L 65/40 |
| 2019/0362444 | A1 * | 11/2019 | Terrell | G01F 15/063 |
| 2019/0385332 | A1 * | 12/2019 | Yajima | G06T 11/001 |

(56)                    References Cited

U.S. PATENT DOCUMENTS

| | | | |
|---|---|---|---|
| 2020/0013230 A1* | 1/2020 | Miller | G06T 19/20 |
| 2020/0090107 A1* | 3/2020 | Mckeeman | G06Q 10/063116 |
| 2020/0146207 A1* | 5/2020 | Long | A01B 63/111 |
| 2020/0154626 A1* | 5/2020 | Schoeny | A01B 63/112 |
| 2020/0272971 A1* | 8/2020 | Ruff | G06Q 10/06313 |
| 2020/0281110 A1* | 9/2020 | McNichols | G06N 3/006 |
| 2021/0064050 A1* | 3/2021 | Pickett | G05D 1/0044 |

OTHER PUBLICATIONS

"Integra Ag Leader Technology Operator Manual Firmware Version 3.3" Apr. 30, 2014, pp. 1-304 (Year: 2014).*

"AFS Pro 700-Software Operating Guide" Case iH, CNH industrial America LLC, Jan. 2015, pp. 1-360 (Year: 2015).*

"AgGPS FieldManager Display-User Guide" Trimble, Apr. 2008 pp. 1-632 (Year: 2008).*

"A Farm Management Information System with Task-Specific, Collaborative Mobile Apps And Cloud Storage Services" Jonathan Tyler Welte Purdue University Purdue e-Pubs Spring 2014 pp. 1-196 (Year: 2014).*

"Simplicity Australia Topcon X30 Seeder Controller Operator's Manual", TOPCON Precision Agriculture, Jan. 2015, pp. 1-146.*

"Integra Ag Leader Technology Operator Manual Firmware Version 3.3" Apr. 30, 2014, pp. 1-304.*

"AFS Pro 700-Software Operating Guide" Case iH, CNH industrial America LLC, Jan. 2015, pp. 1-360.*

"AgGPS FieldManager Display-User Guide" Trimble, Apr. 2008 pp. 1-632.*

"A Farm Management Information System with Task-Specific, Collaborative Mobile Apps And Cloud Storage Services" Jonathan Tyler Welte Purdue University Purdue e-Pubs Spring 2014 pp. 1-196.*

Kinze Manufacturing, Inc., PCT/US2017/064246 filed Dec. 1, 2017, "The International Search Report and the Written Opinion of the International Searching Authority, or the Declaration", 12 pages, mailed Mar. 28, 2018.

* cited by examiner

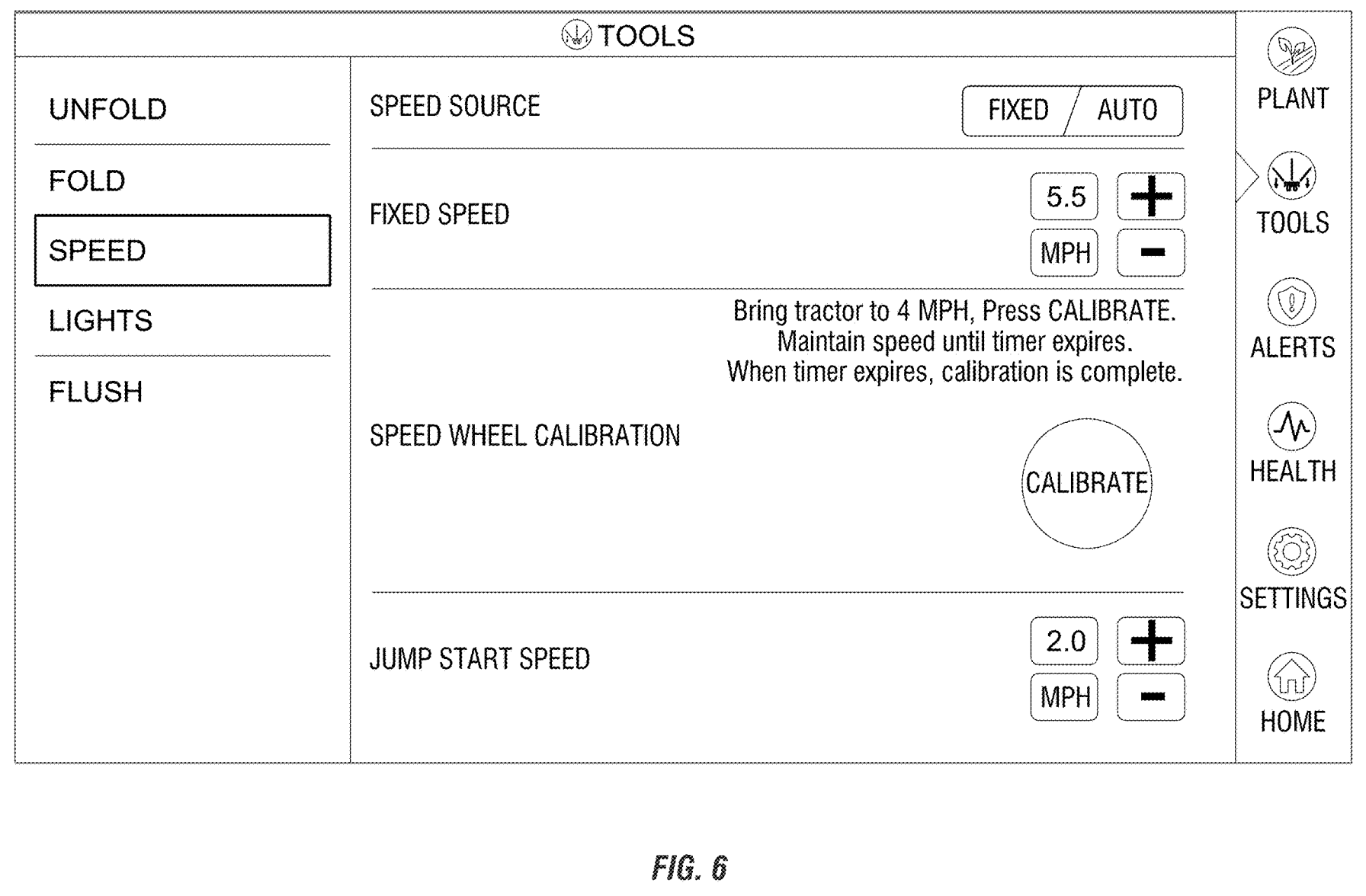

PLANT

TOOLS

ALERTS

HEALTH

SETTINGS

HOME

TOOLS

UNFOLD

FOLD

SPEED

LIGHTS

FLUSH

SPEED SOURCE     FIXED / AUTO

FIXED SPEED     5.5   +   MPH   −

SPEED WHEEL CALIBRATION

Bring tractor to 4 MPH, Press CALIBRATE.
Maintain speed until timer expires.
When timer expires, calibration is complete.

CALIBRATE

JUMP START SPEED     2.0   +   MPH   −

*FIG. 6*

Figure 21:
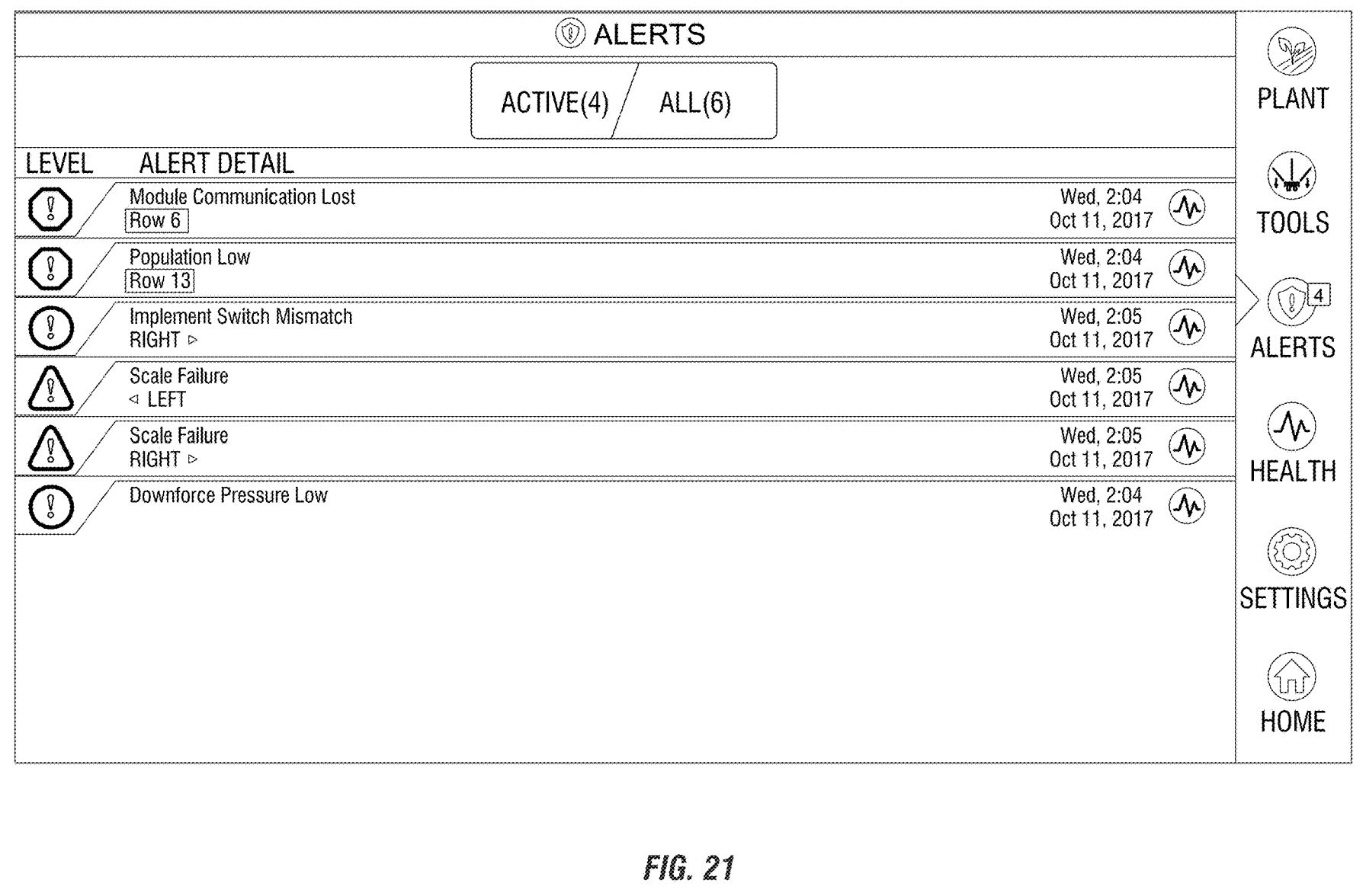

PLANT

TOOLS

ALERTS

HEALTH

SETTINGS

HOME

ALERTS

ACTIVE(4) / ALL(6)

LEVEL    ALERT DETAIL

Module Communication Lost
Row 6
Wed, 2:04
Oct 11, 2017

Population Low
Row 13
Wed, 2:04
Oct 11, 2017

Implement Switch Mismatch
RIGHT △
Wed, 2:05
Oct 11, 2017

Scale Failure
◁ LEFT
Wed, 2:05
Oct 11, 2017

Scale Failure
RIGHT ▷
Wed, 2:05
Oct 11, 2017

Downforce Pressure Low
Wed, 2:04
Oct 11, 2017

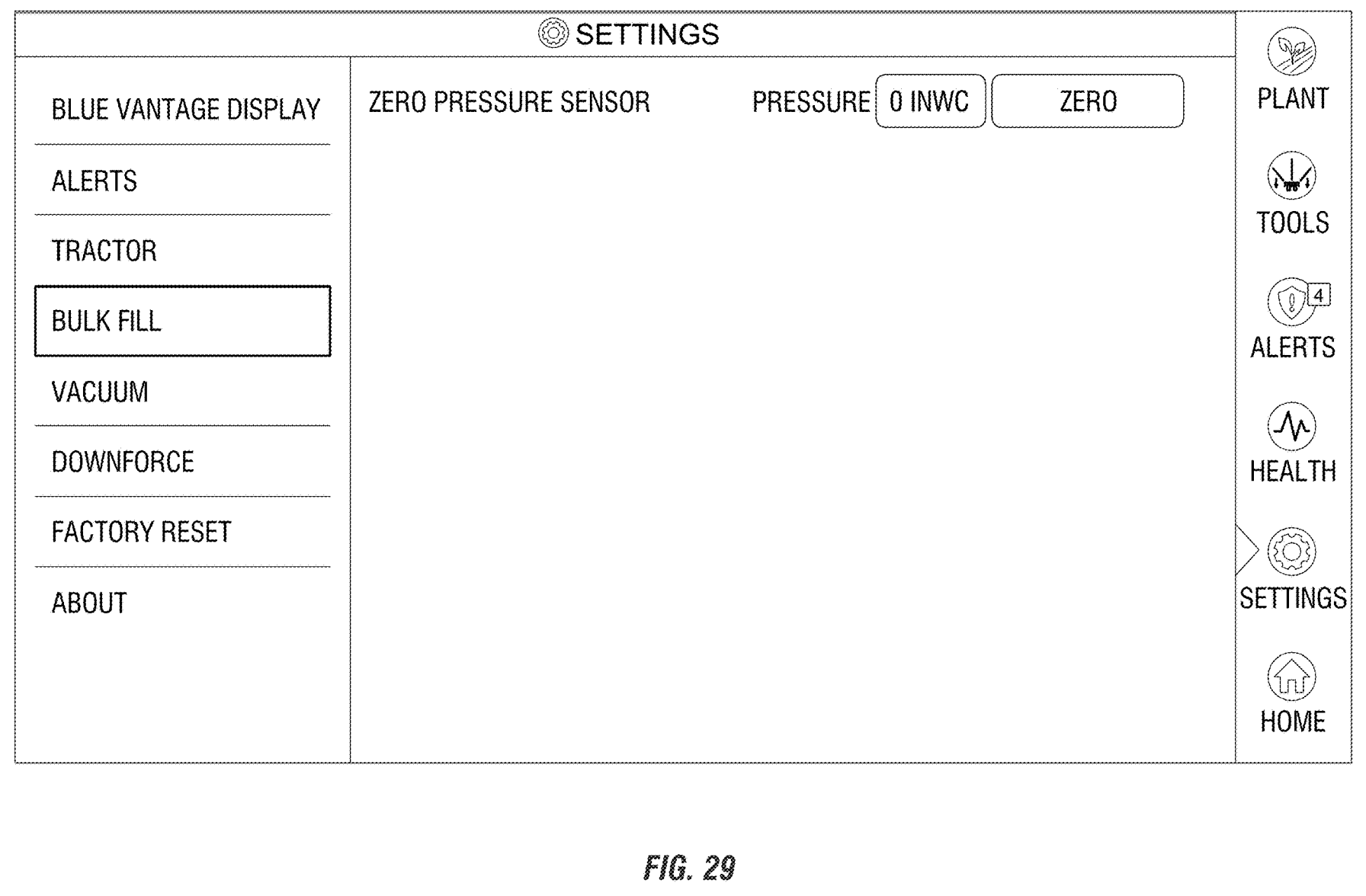

PLANT

TOOLS

ALERTS

HEALTH

SETTINGS

HOME

SETTINGS

ZERO PRESSURE SENSOR

PRESSURE   0 INWC   ZERO

BLUE VANTAGE DISPLAY

ALERTS

TRACTOR

BULK FILL

VACUUM

DOWNFORCE

FACTORY RESET

ABOUT

FIG. 29

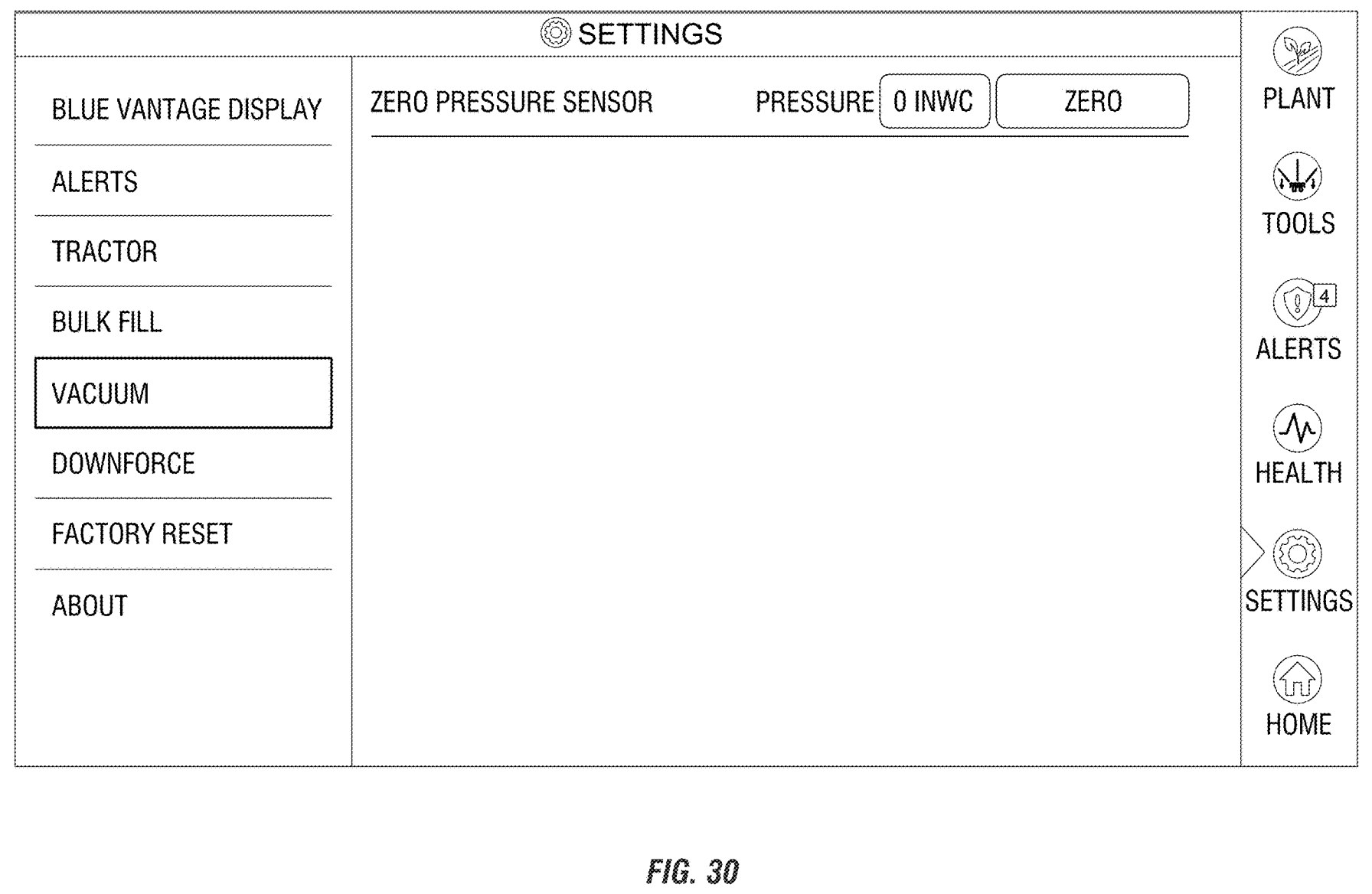

⊙ SETTINGS

PLANT

TOOLS

ALERTS

HEALTH

SETTINGS

HOME

ZERO PRESSURE SENSOR

PRESSURE | 0 INWC | ZERO

BLUE VANTAGE DISPLAY

ALERTS

TRACTOR

BULK FILL

VACUUM

DOWNFORCE

FACTORY RESET

ABOUT

*FIG. 30*

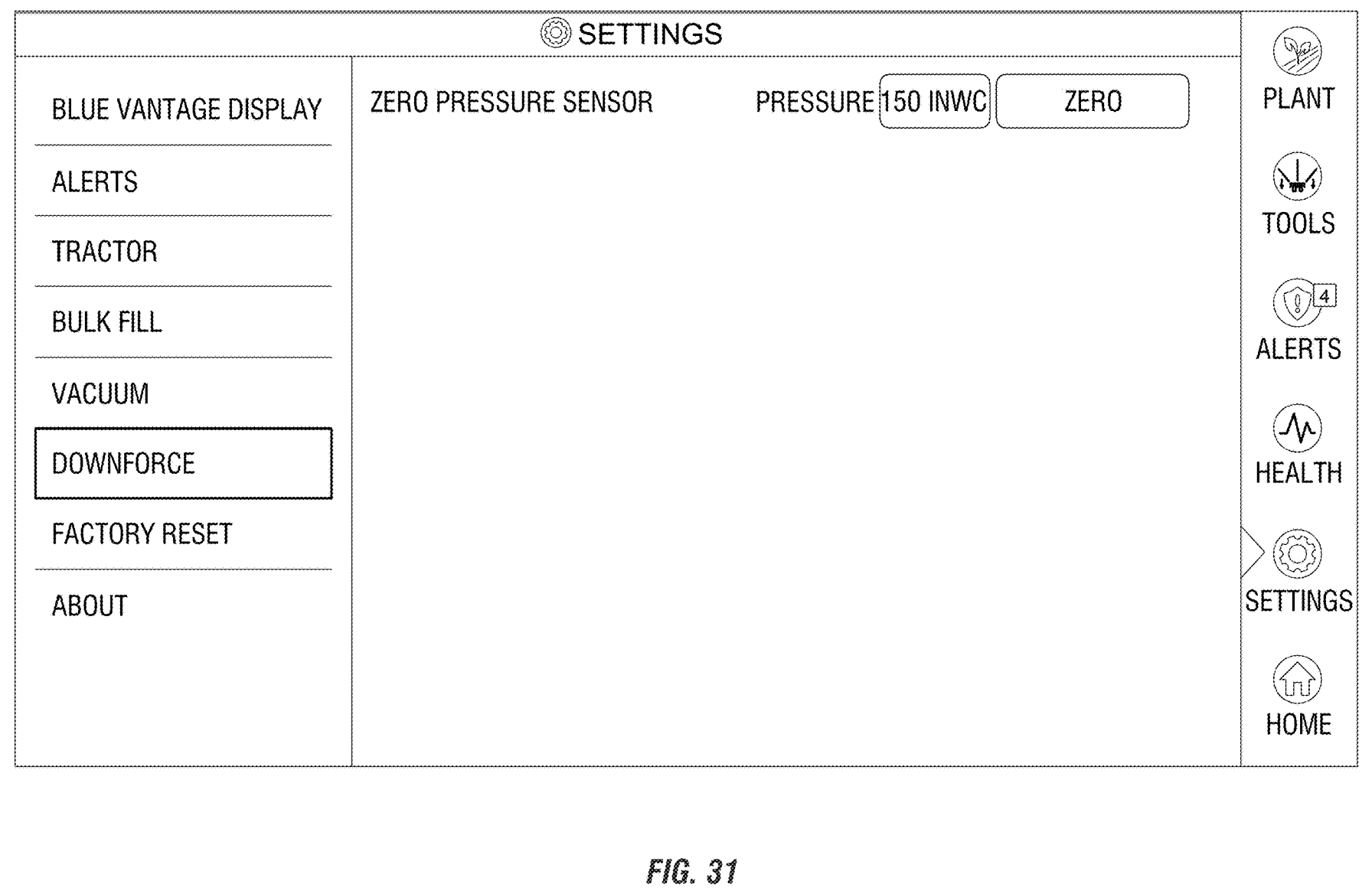

PLANT

TOOLS

ALERTS

HEALTH

SETTINGS

HOME

⊙ SETTINGS

ZERO PRESSURE SENSOR                PRESSURE 150 INWC        ZERO

BLUE VANTAGE DISPLAY

ALERTS

TRACTOR

BULK FILL

VACUUM

DOWNFORCE

FACTORY RESET

ABOUT

*FIG. 31*

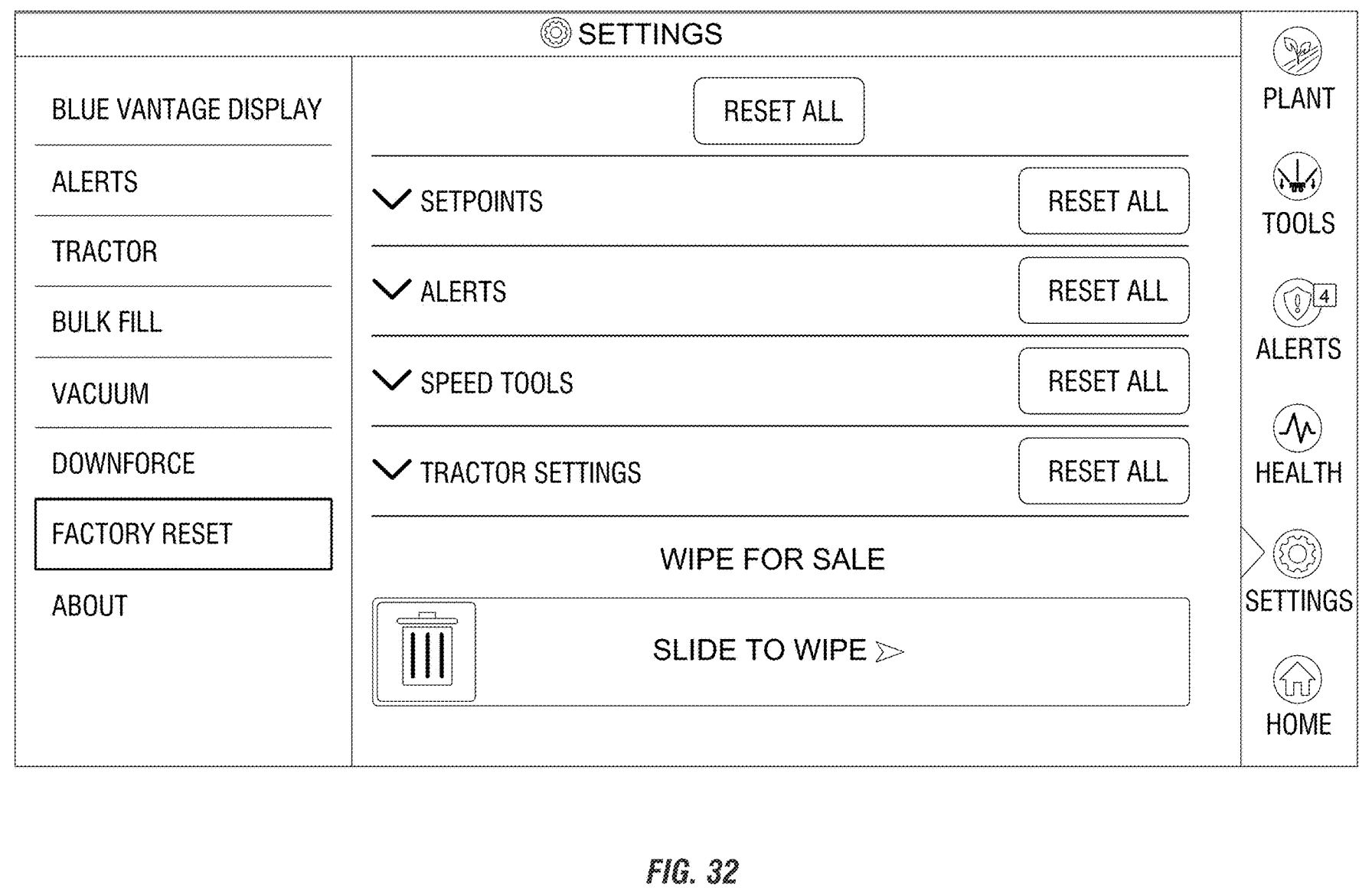

PLANT

TOOLS

ALERTS

HEALTH

SETTINGS

HOME

SETTINGS

RESET ALL

BLUE VANTAGE DISPLAY

ALERTS                          SETPOINTS              RESET ALL

TRACTOR                         ALERTS                 RESET ALL

BULK FILL                       SPEED TOOLS            RESET ALL

VACUUM                          TRACTOR SETTINGS       RESET ALL

DOWNFORCE

FACTORY RESET                   WIPE FOR SALE

ABOUT                           SLIDE TO WIPE

FIG. 32

SYSTEMS, METHODS, AND/OR APPARATUS FOR PROVIDING A USER DISPLAY AND INTERFACE FOR USE WITH AN AGRICULTURAL IMPLEMENT

CROSS-REFERENCE TO RELATED APPLICATIONS

This application is a continuation of PCT/US2017/064246, filed Dec. 1, 2017, which claims priority under 35 U.S.C. § 119 to Provisional Application Ser. No. 62/428,725, filed on Dec. 1, 2016, all of which are herein incorporated by reference in their entirety and for all purposes.

FIELD OF THE INVENTION

Aspects of the disclosure are directed generally towards a control and/or display unit including an interactive graphical user interface showing operations related to one or more agricultural implements and providing data and other feedback related to the same.

BACKGROUND OF THE INVENTION

An agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

Because the planter is pulled by a tractor or other tow vehicle with an operator remote from the planter, it may be desirable for an operator to view data associated with the operation of the planter in order for the operator to know information related to the planting of one or more types of seed. This information can ensure that desirable agronomical parameters associated with the planting of the particular type of seed are being met and/or maintained by settings of the planter. This would allow the operator to update, on-the-fly, any such setting of the planter to within such an acceptable parameter.

Still further, it may be desirable view other data, sensor information, or other settings related to the planter and/or planting of the seed in order to track and store the information for a later use. This may include the review of the data during or after the growing season, such as at harvest, to aid in providing updated agronomical information to be used in future years to aid in increasing the yield of planted seed.

Therefore, there is a need in the art for a control and/or display unit in communication with an agricultural implement, such as a planter, in which the unit is able to display information related to one or more agricultural operations, provide an interface to update one or more settings of the implement, to record and store data associated with one or more operations, and to provide for communication to one or more additional devices for communicating any of the information related to the agricultural implement and/or farming operation.

SUMMARY OF THE INVENTION

Thus, it is a principle object, feature, and/or advantage of the disclosure to overcome deficiencies in the art.

It is another object, feature, and/or advantage of the disclosure to provide systems, methods, and/or apparatus for providing monitoring, storing, and inputting in a display unit in communication with an agricultural implement.

It is still another object, feature, and/or advantage of the disclosure to provide an interactive user display for providing information related to one or more operations related to an agricultural implement.

It is yet another object, feature, and/or advantage of the disclosure to provide a graphical user display real time information related to the one or more operations of the agricultural implement.

It is a further object, feature, and/or advantage of the disclosure to provide a system in which information can be stored and later recalled to evaluate future operations related to the agricultural implement.

It is still a further object, feature, and/or advantage to provide a unit that can be at least temporarily positioned in a single place, but that can be removed to provide a portable unit for performing additional operations.

BRIEF DESCRIPTION OF THE DRAWINGS

FIGS. 5-8 are additional depictions of tools screens of a display unit.

FIG. 21 is an exemplary depiction of an alerts screen of a display unit according to aspects of the invention.

FIGS. 25-33 are examples of settings screens of a display unit according to aspects of the invention.

Figure 1:
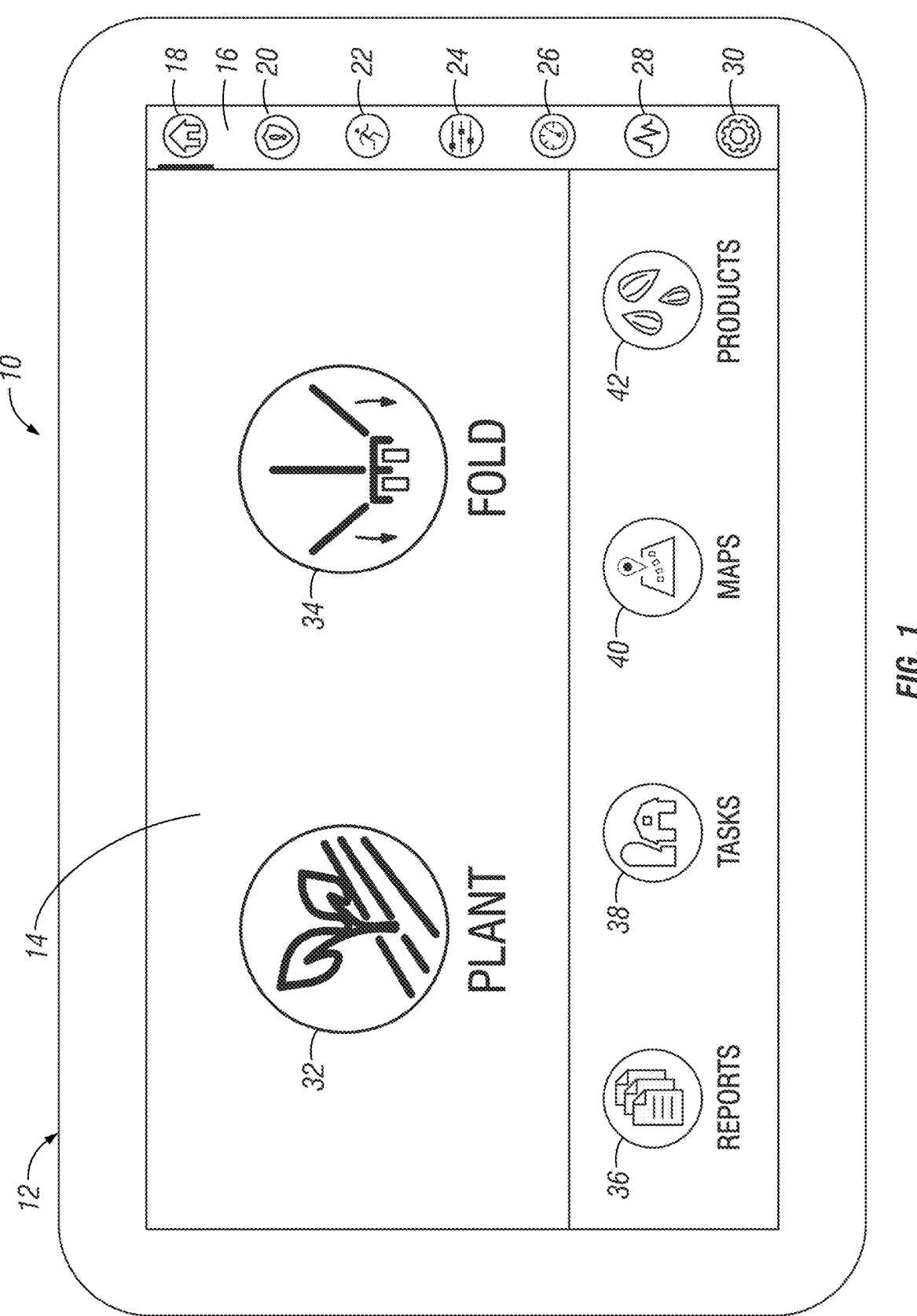
FIG. 1 is a depiction of a home screen of display unit according to aspects of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present disclosure is directed towards a display unit 10, which may also be a referred to as a user interface unit, monitor and input unit, monitor unit, interactive display, or other relative term. The display unit 10 is configured to be used with an agricultural implement, while being remote from an agricultural implement. For example, it is contemplated that the display unit 10 be in communication, such as electronic communication, with a planter. An operator can utilize the display unit 10 remote from the planter, such as in a tractor or other tow vehicle that is connected to the planter. The display unit 10 can be displayed within the tow vehicle, but is also configured to be removable therefrom, thus creating a portable unit. The display unit 10 can take many forms and can generally be considered or can comprise an intelligent control. For example, an intelligent control is generally considered to be a computer readable medium or computing device or an apparatus including a processing unit. Examples of such units can be tablets, computers, servers, cell phones, or generally any other handheld, portable, permanent, or other device which may include a central processing unit and a graphical user interface (GUI). The graphical user interface may also be a user interface (UI) without the graphics required. Additional aspects of the display unit can include connections to wires to be able to communicate electronically to the planter. Still further, it is contemplated that the unit 10 be communicated in a wireless fashion, such as any wireless connection. This can include, but is not limited to Bluetooth, Wi-Fi, cellular data, radio waves, satellite, or generally any other form of wireless connection which will allow for communication between the unit 10 and the planter. Therefore, the unit 10 will include generally any electronic components necessary to allow for such wireless or wired communication. The wired communication can take the form of CAN bus, Ethernet, co-axial cable, fiber optic line, or generally any other line which will allow for communication between the unit 10 and the implement and/or planter.

The display unit 10 as shown in the figures takes the form generally of a tablet device. The unit 10 includes a housing 12 surrounding a screen 14. For example, the housing can be plastic or other material that will provide durability and protection for the unit. The display can comprise glass, Plexiglas, plastic, or other material capable of allowing viewing while also being interactive, either by button, touch (capacitance), or via an external member (stylus, mouse, etc.)

As shown in the figures, the screen is a graphical user interface screen, which includes both graphics and words thereon. The screen can be backlit or include other lighting to show the graphics, words, or other aspects of the unit 10. Furthermore, the screen 14 can be touch sensitive to allow for the interaction of the screen via contact with said screen 14. The contact can take the form of an operator via finger, glove, or an external device (stylus, push-button, mouse, keyboard, etc.) which will interact with aspects of the screen to receive an input from the operator. Furthermore, the screen may include feedback to the operator. For example, the feedback can be haptic or touch sensitive such that an input via a touch with the appendage of the operator will result in a touch or haptic response at the screen to indicate that the input has been recognized. Other feedback can take the form of sound wherein the input by an operator will be recognized via a sound being played by a speaker of the unit 10 to designate that the unit has been recognized. The sound can also be such that the feedback will alert the operator whether a good input has been recognized such as an input in the right location. For example, a certain sound can be played when an input is recognized, while a different sound can be outputted when a bad input such as interaction with the screen in an unrecognized location on the graphics shown on the screen 14. However, the display unit 10 should not be limited to any of said feedback types disclosed herein, and should be contemplated to include generally any type of feedback including, but not limited to haptic or touch feedback, sound feedback, and/or some combination thereof.

Furthermore, while the housing 12 is shown to be surrounding the screen 14, it is contemplated that the housing can take many different forms, and can include one or more interactions with the unit 10. For example, the housing can include connections for wired connection to the housing 12. Such a wired connection can be a cable for charging the unit, a cable for connecting the unit 10 to an implement, wires for connecting the unit to an external device, such as for transmitting data or any other information from one to the other, and/or any other type of wired connection. In addition, the housing can include one or more physical buttons or non-physical buttons. Such a physical button is one such that will provide a physical movement when inputted by an operator. A non-physical button is such that an interaction with an appendage or other external device will input an action to the unit 10 without any sort of physical movement. A non-physical button can include feedback; such as sound or other haptic responses to alert the operator that the input has been recognized.

While the screen 14 will be shown in various configurations throughout the figures, it should be contemplated that these are for exemplary purposes, and all aspects shown need not be required. For example, various layouts, words, button types, graphics, and the like will be shown and described herein, but it is to be contemplated that the display and/or function of the display unit need not take the exact one shown in the figures. For example, as shown in the figures, and in particular FIG. 1, a generally static action bar 16 is shown on the rights side of the figure. The action bar 16 is a location region including a plurality of action style buttons, wherein the interaction or input of one of the buttons will result in the screen changing based on the input. For example, the buttons shown in the figures show a home button 18, an alert button 20, run or operate button 22, a rates button 24, a set point button 26, an implement diagnostics button 28, and a settings button 30. By interaction with one of the buttons of the action bar 16, the screen will respond with different options, displays, screen layouts, and will communicate different operations to the tractor and/or planter. For example, in FIG. 1 the home button 18 has been selected to show what an exemplary screen may look like as a "home" screen. A screen 14 in the home setting includes a plurality of action buttons. The buttons as shown on the screen 16 in FIG. 1 are non-physical buttons, but may include a haptic, sound, and/or optical feedback to indicate the activation of one or more of the buttons. For example, such buttons as is shown in FIG. 1 include a plant button 32, a fold button 34, a reports button 36, tasks button 38, a maps button 40, and a products button 42. As will be understood, the interaction with one of said buttons, such as pressing one's finger on or against the plant word or icon 32 will indicate a desire to go to a screen associated with said button. The selection of the plant button 32 will open a new screen which will be associated with the planting by the implement associated with or in communication with the display unit 10. Likewise, interaction with any of the other buttons as is shown on the screen 14 on FIG. 1 will open additional screens and/or sub-screens associated with the button that has been selected.

Figure 2:
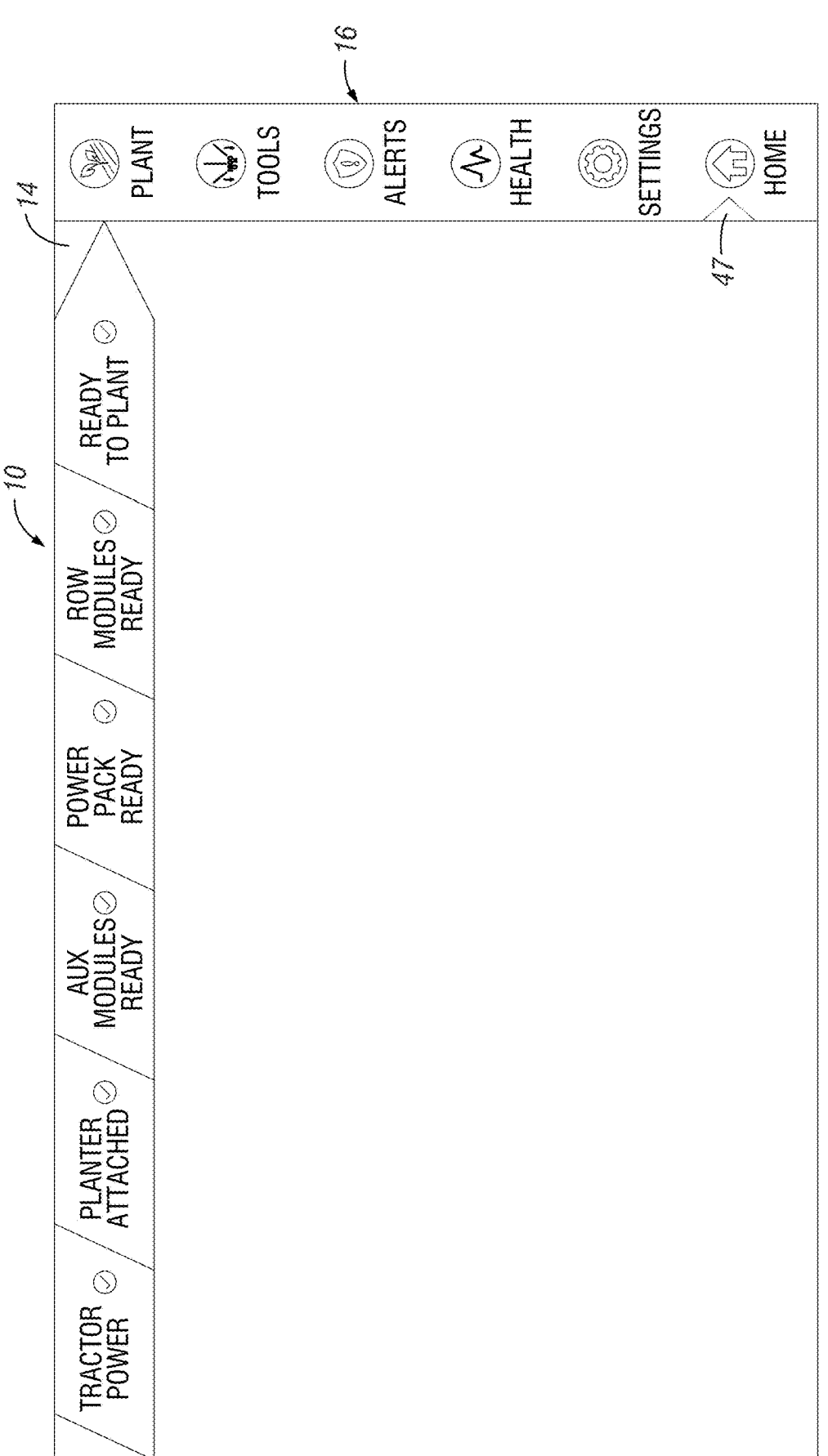
FIG. 2 is another depiction of a home screen of a display unit.

FIG. 2 is another example of a home screen for use with the display unit 10. The screen 14 shown in FIG. 2 includes the action bar 16 along the right-hand side of the screen 14 and includes addition information along the top portion of the screen 14, which may be in the form of a top bar. The top bar may be an action bar that can be interfaced by a user, can be a status bar showing the status of one or more features, or could be a combination thereof. Furthermore, it should be noted that that the action bar 16 at the right of the screen 14 includes similar, but some different action items than that of FIG. 1. For example, in the figure, it is "PLANT", "TOOLS", "ALERTS", "HEALTH", "SETTINGS", and "HOME". In FIG. 2, it is noted that the indicator shows that the screen 14 is currently set to the HOME action item.

Figure 3:
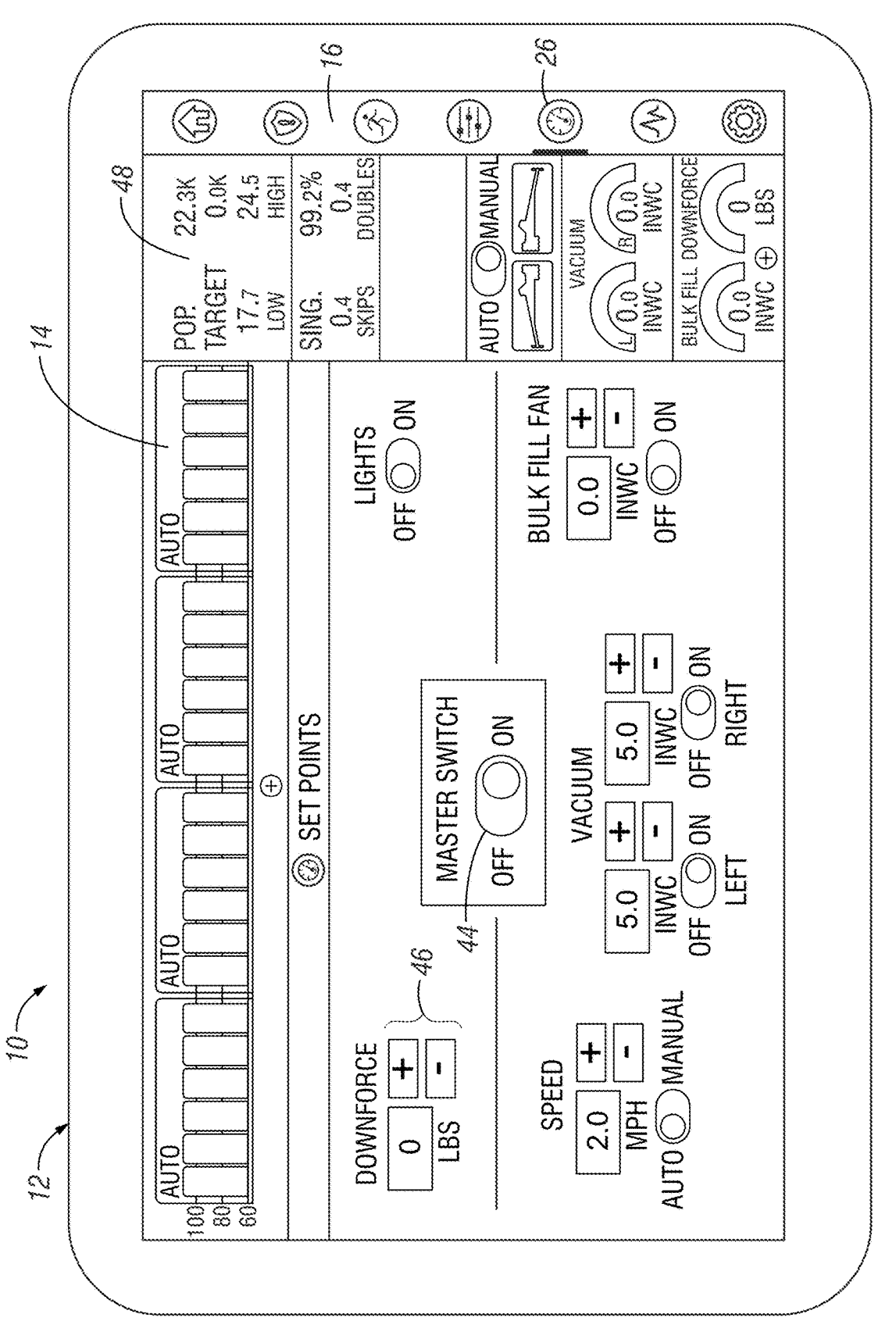
FIG. 3 is a depiction of a set points/tools screen of a display unit.

FIG. 3 is another exemplary view of the screen 14 of the display unit 10. In FIG. 3, the set point button 26 and the action bar 16 has been selected. Selection of said set points button 26 has brought open a new display (screen layout) on the screen 14. The display that is shown on the screen 14 in FIG. 3 is associated with set points or other parameters for the planting operation by the planter in communication with the display unit 10. As the screen is a graphical user interface, the graphics and options associated with said touch screen 14 have changed because of the selection of the set points button 26 in the action bar 16. However, the screen 14 now indicates a plethora of new selections and/or inputs that are associated with the operation of the planter. For example, the screen as shown in FIG. 3 includes a plurality of toggle buttons 44 which will toggle selection between off and on settings. The toggle buttons can take many forms, such that the selections can be one or the other, such as on or off. This can include turning a master switch on or off, or change in lights on or off. Therefore, interaction with the toggle button will switch the selection between on and off, which will indicate and communicate to the planter to respond to said selection. Still further, there are as shown a plurality of increment buttons 46. The increment buttons are associated with options that have varying amounts of selections. For example, it is noted in FIG. 3 that the screen shows a speed setting. The speed setting includes both a toggle button 44 and an increment button 46. When the toggle button has been set at the auto selection, the user display unit 10 will communicate to the planter to automatically adjust its speed based on an additional setting, such as the speed of the tow vehicle pulling or towing the planter. However, the selection can be switched to manual, wherein the speed can be incrementally changed, such as changing the speed or population of the row units of the planter to vary based upon the user input. Therefore, while two miles per hour shown as the speed, the increment button can be increased by the tenth or whole units to adjust the speed of the tow vehicle, towed vehicle, or some combination thereof. Therefore, the inclusion of the toggle and increment buttons provides for numerous adjustments for both the tow unit and/or towed vehicle or implement via the display unit 10.

Also shown in FIG. 3 are a plurality of expandable subscreens 48. These include, but are not limited to, the population and target screens, singulation data, marker buttons, vacuum screens, as well as bulk fill and downforce screens. There are also such screens related to the row unit sections 51. Said expandable subscreens show data associated with the operations of the implement connected to said display unit 10. Therefore, in FIG. 3, subscreens 48 show data or settings associated with the planting of seed via the planter. The interaction with one of the subscreens 48 may expand the subscreen to a slightly larger screen such that a screen can provide more or less information, including more or less options for changing or setting input or data or goals associated with the operation. For example, the singulation subscreen can show the singulation percentage (which is shown to be 99.2%) as well as the values associated with skips and or doubles. However, that screen can be expanded or contracted, such as to only show the singulation percentage and not the skips and doubles. Furthermore, the screens, such as the marker screen, can be activated and expanded to toggle between auto and manual settings, such as to change the position to one or more markers as the implement moves through a field. Therefore, the screen 14 as shown in FIG. 3 shows yet additional functions and/or options of the display unit 10.

Figure 4:
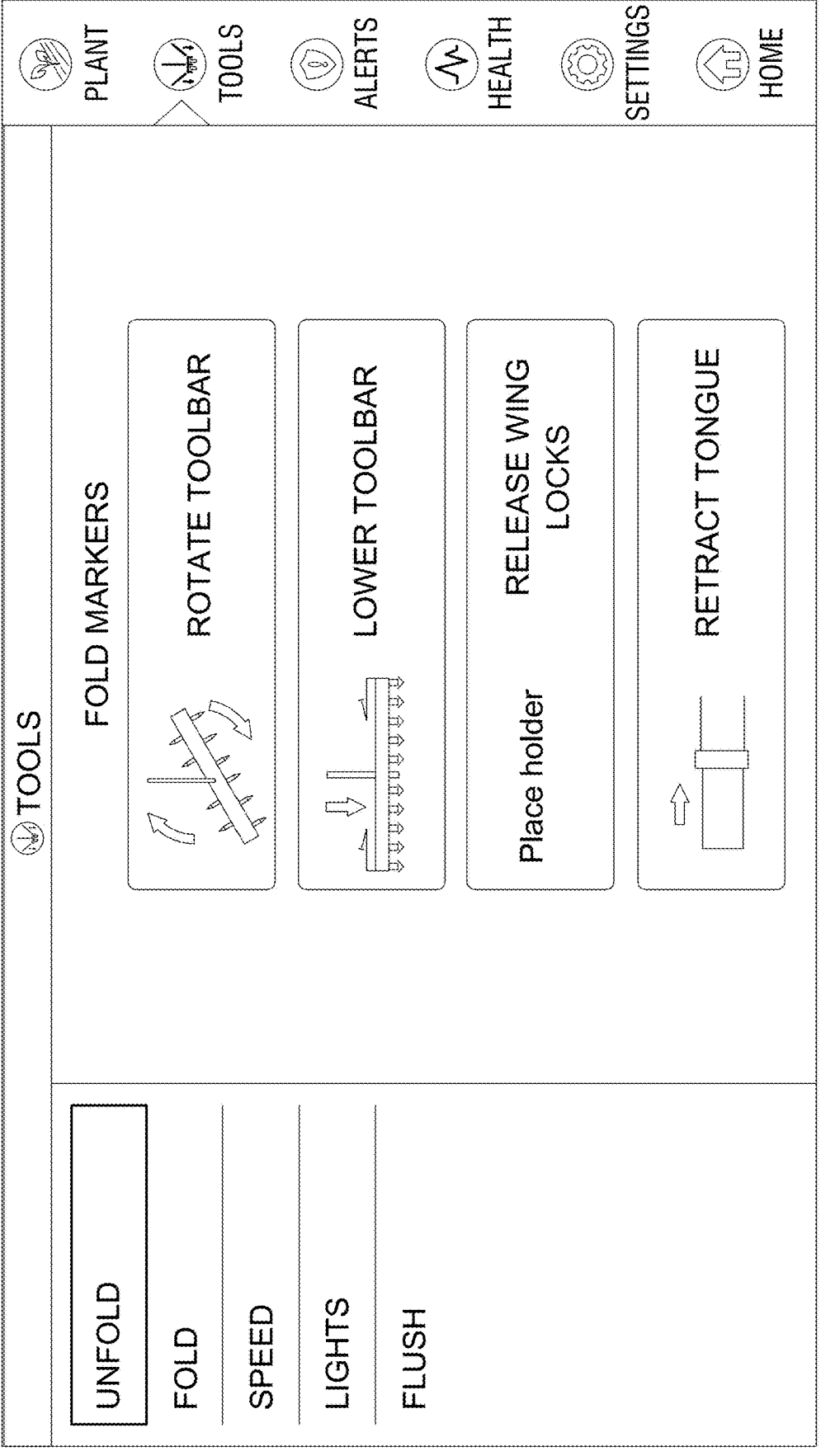
FIG. 4 is a depiction of a tools screen of a display unit.

FIGS. 4-8 are similar to FIG. 3, but show additional exemplary embodiments, aspects, and/or configurations for a screen 14. As shown in FIGS. 4-8, the TOOLS action button is selected, as shown by the indicator adjacent the TOOLS icon. The TOOLS include some of the setup and/or configurations of the agricultural implement connected to the display unit 10, and will provide a plurality of selections based upon the implement. For example, the figures show the implement to be an agricultural planter. FIG. 4 shows options, such as unfold options. These unfold options can be used to operate/rotate the toolbar, raise or lower the toolbar, release wing locks, and retract the tongue. These are all steps associated with unfolded a planter with wings, and are shown in a suggested, chronological order.

Figure 5:
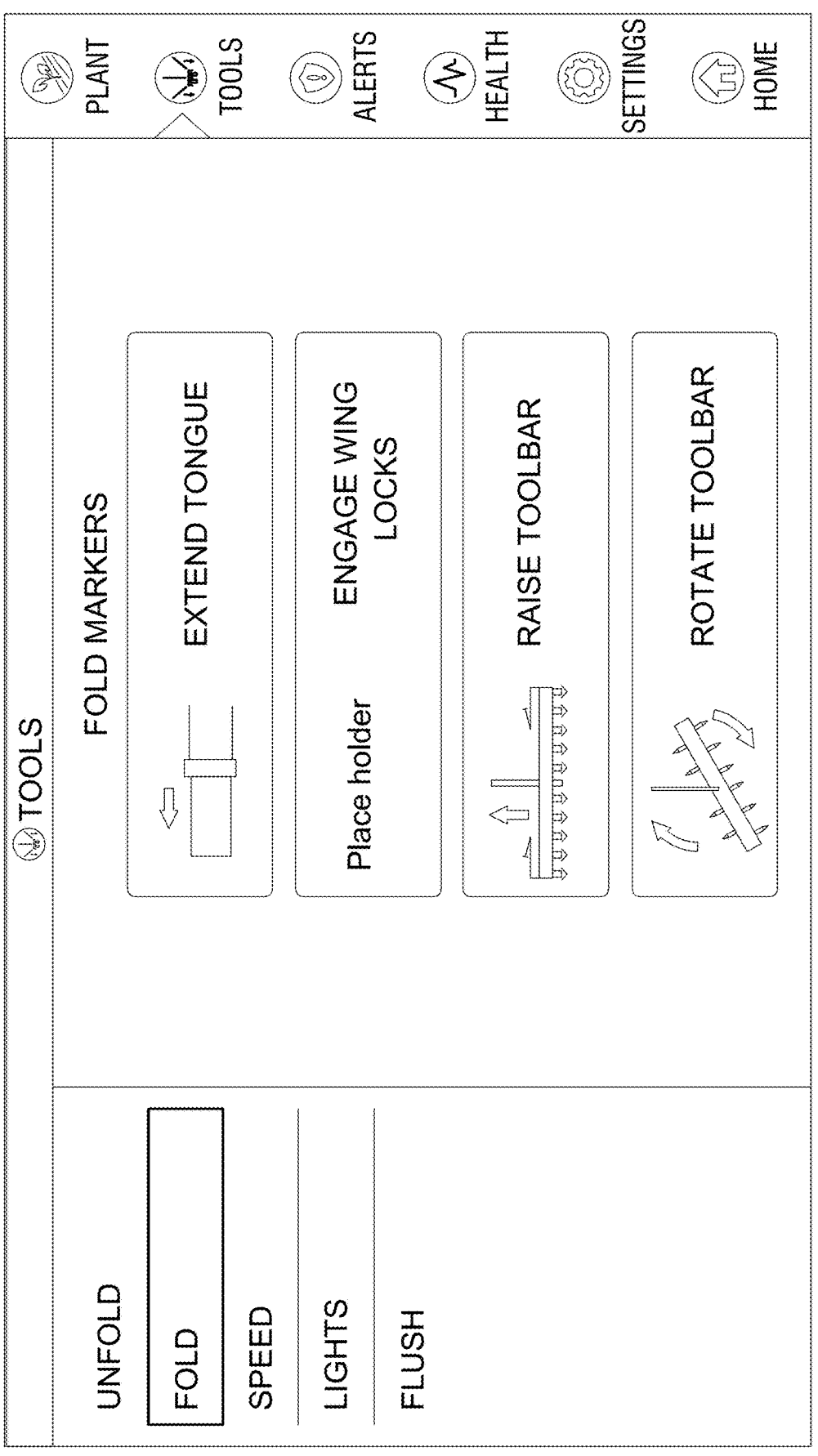

FIG. 5 shows steps associated with the folding of a planter, such as from a field use configuration to a transport configuration. The steps associated with such a fold are shown in the figure, and include, but are not limited to, extending the tongue, engaging wing locks, raising the toolbar, and rotating the toolbar. These are shown to be chronological to provide guidance and to attempt to mitigate damage to the implement.

FIG. 6 shows options related to the speed of the implement, i.e., the planter. Such options shown can include whether the speed source is fixed or automatically changed. Buttons are shown for this. When fixed, the speed can be set. Further, the speed of the implement can be calibrated with the tow vehicle (e.g., tractor) so that the rest of the settings of the planter operate at the proper speed. A jump start speed is also provided to begin or otherwise start the speed of the implement, and includes pop dials that can be incrementally increased/decreased, such as by integer or some fraction thereof (e.g., tenths, hundredths, etc.).

Figure 7:
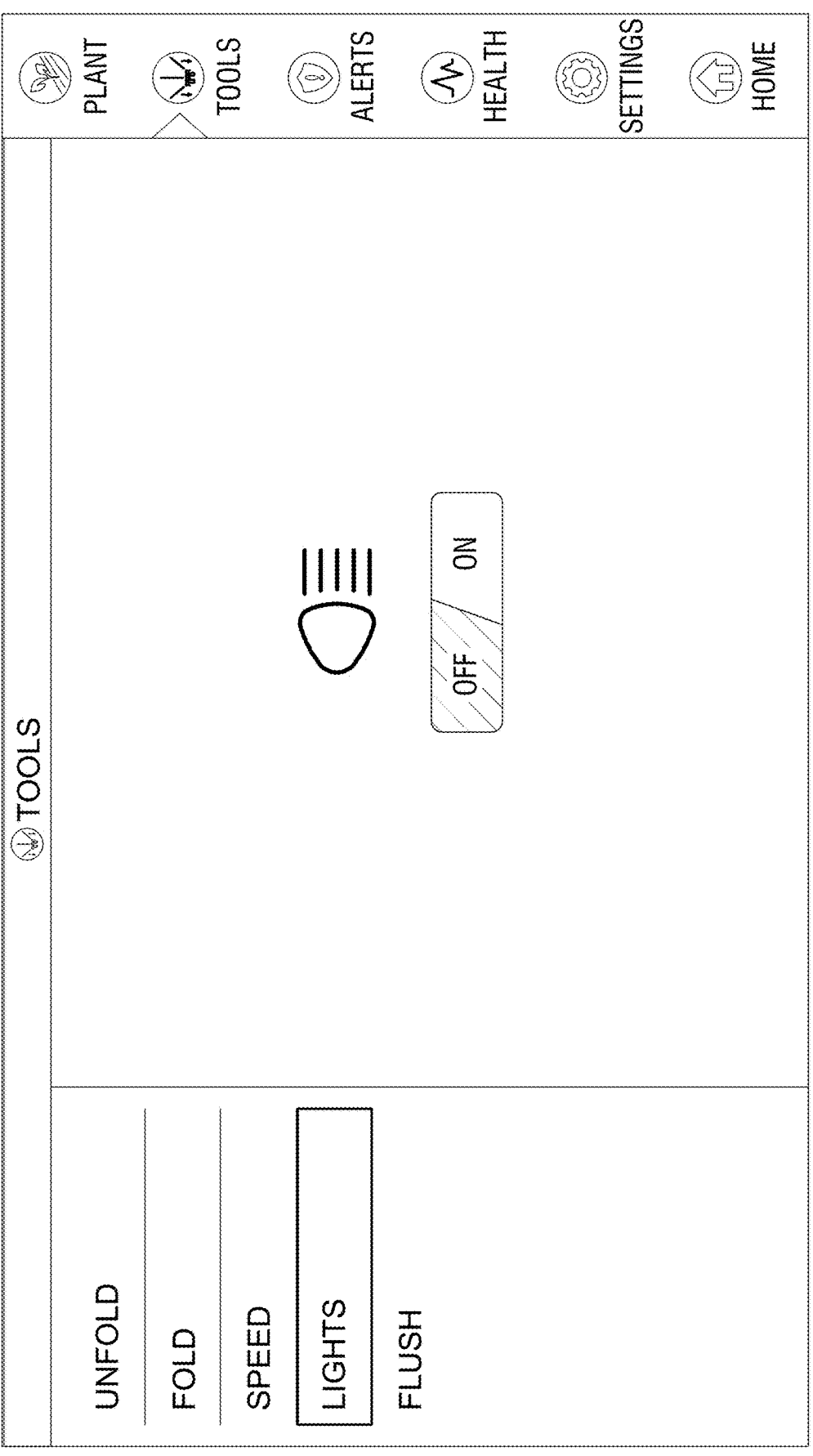

FIG. 7 provides a lights toggle switch to turn on/off the lights of the implement. As shown in FIG. 7, the lights are in the off position.

Figure 8:
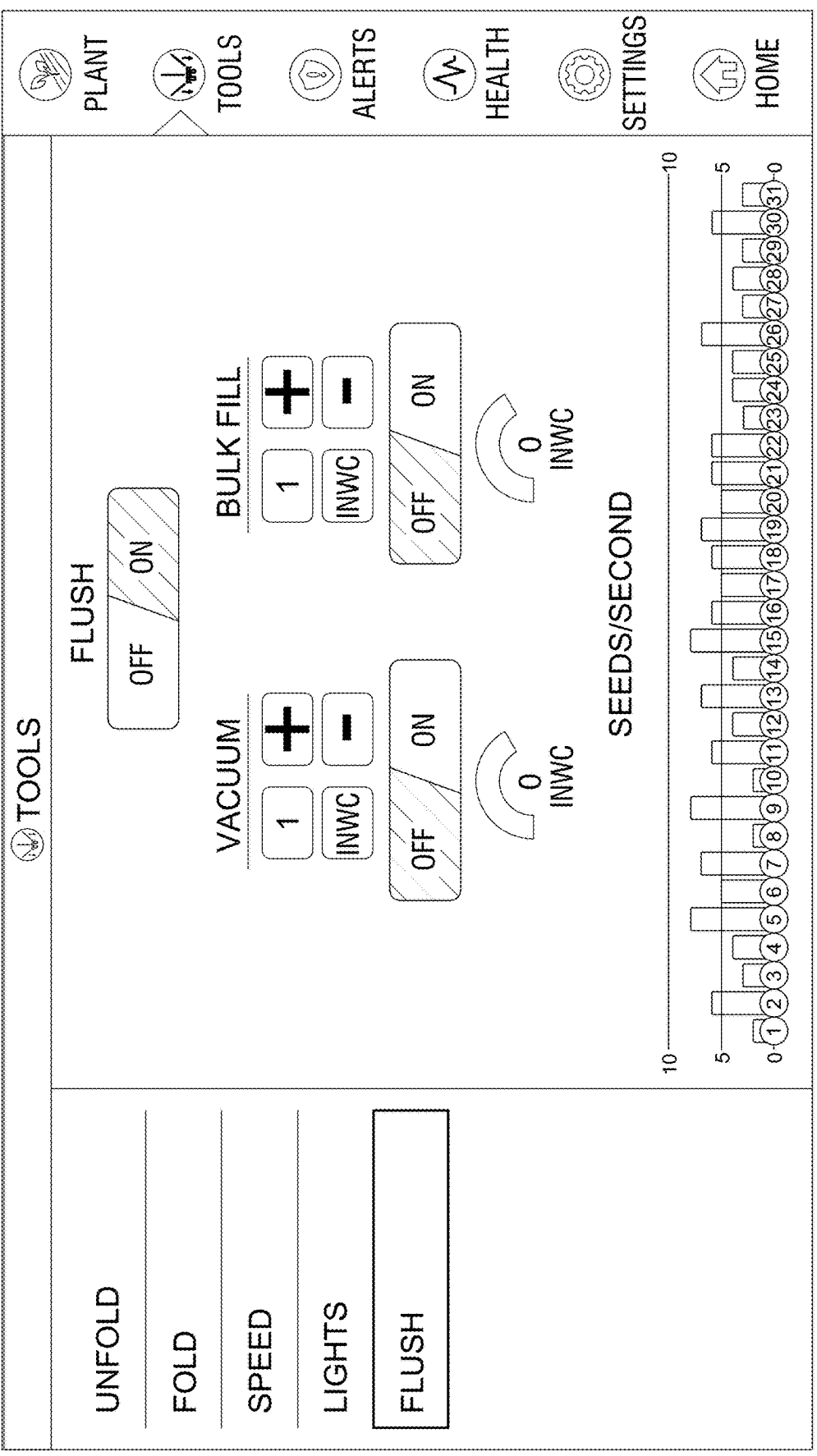

FIG. 8 shows flush options for the implement. The flushing can be toggled on or off. Furthermore, the flushing can be done for both the vacuum and the bulk fill. This can involve operating the fans to flush out any built-up pressure, air, particulate, at the devices, between the fans and row units, or even at the row units. Again, an incremental option is provided to adjust the pressure used for the flushing of the devices. An arched display is shown as well to show the progress/status of the flushing.

Figure 9:
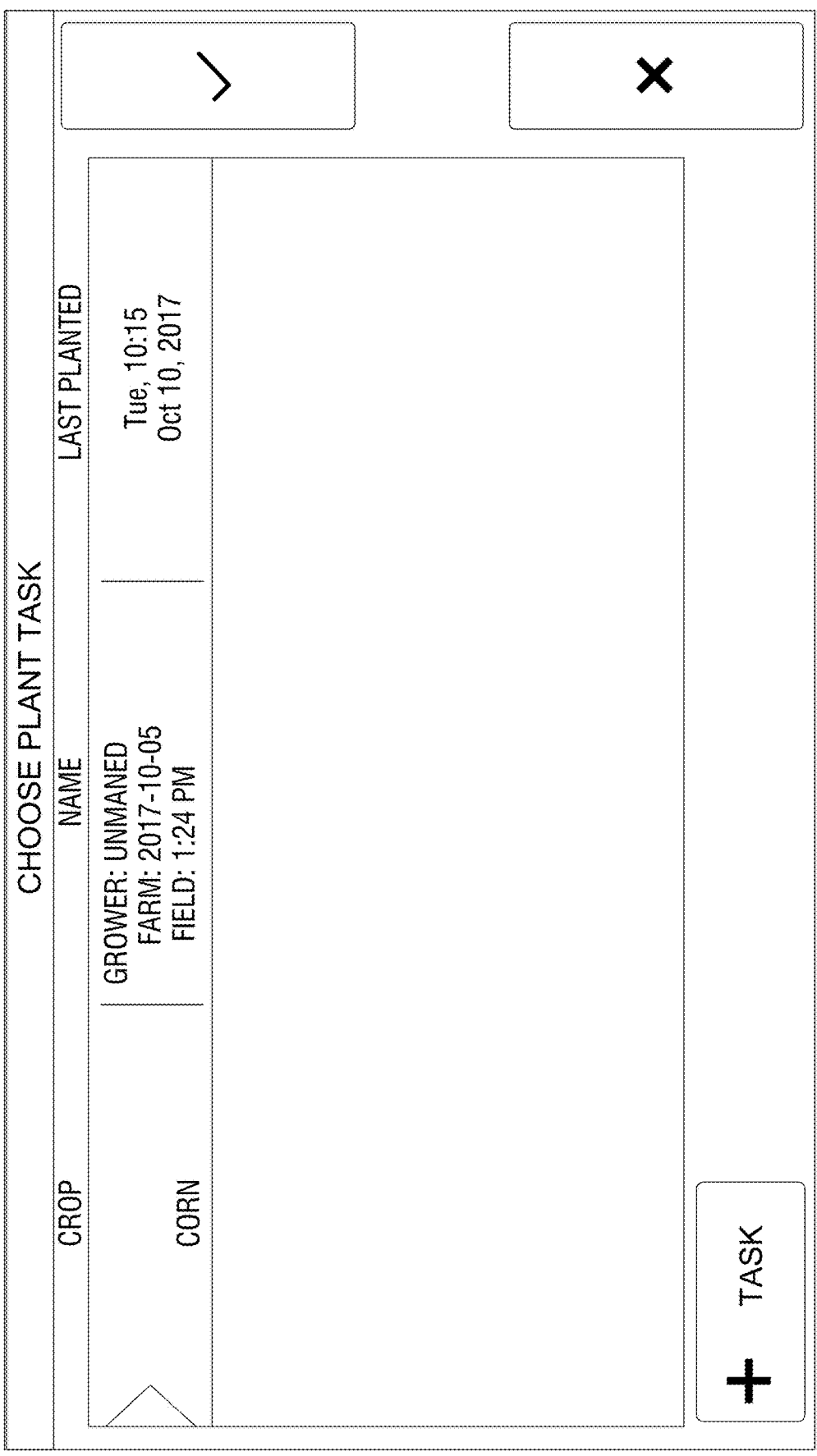
FIGS. 9-15 are example screens showing the set up of a display unit and/or a farming operation using a display unit according to aspects of the invention.

FIGS. 9-15 show a setup for the beginning of a farming operation, which can provide summaries, data, or other information to be used at a later time. For example, the field can be set up in the display 10 with the settings used to operate/plant in the field. This information can be later used to see the outputs obtained based upon the settings, weather, timing, and other information provided to determine future best practices for agronomic efficiencies. As such, FIG. 9 shows a screen 14 that includes a TASK button that allows for a task to be set up, such as planting corn of a certain brand in certain field at a certain time. Confirmation and cancellation buttons are shown along the right of the screen 14.

Figure 10:
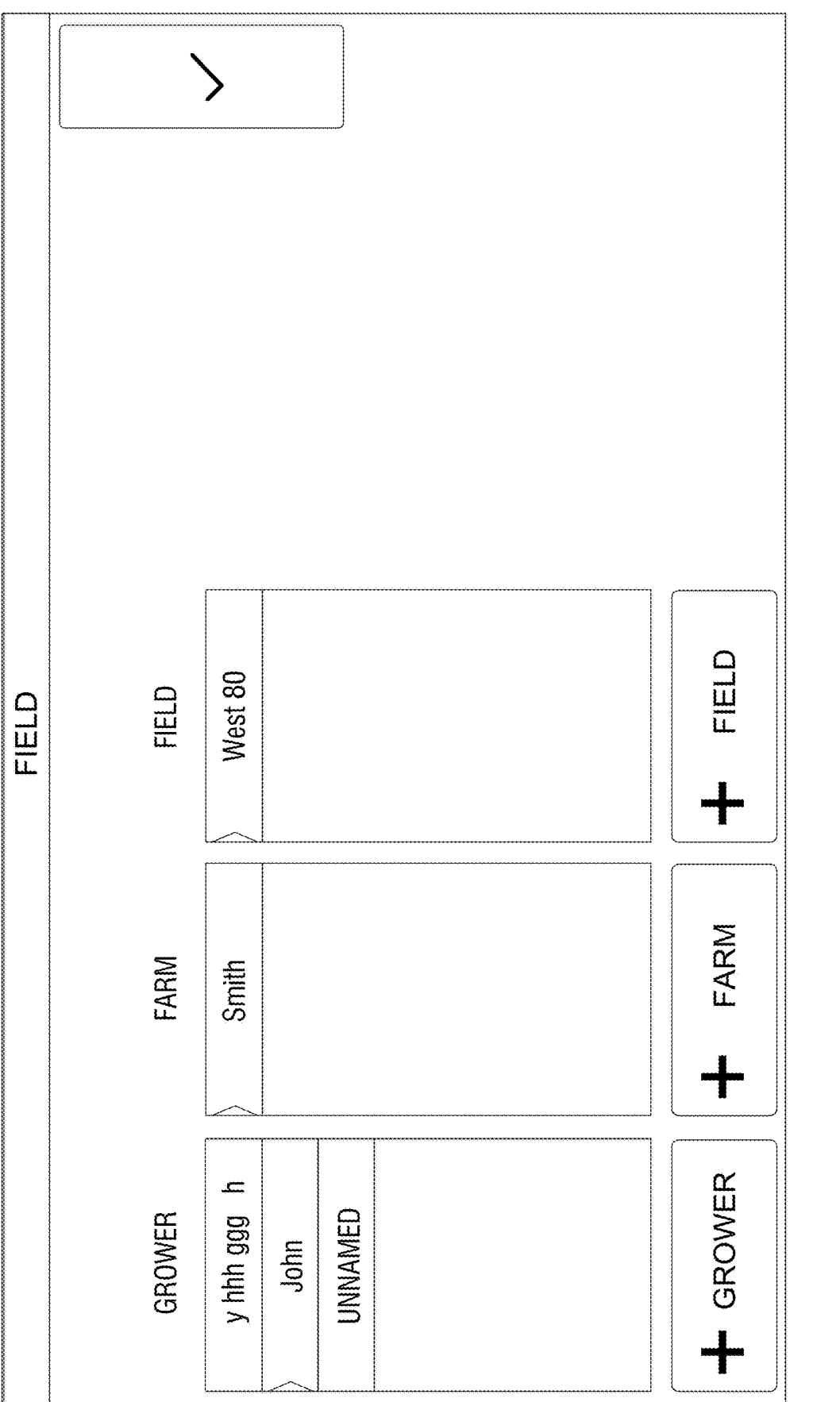

FIG. 10 shows the inputs for a new task. The information asked for in the screen 14 of FIG. 10 includes GROWER information, which is who is the farmer/operator, FARM information, which is an indicator for the farm name, and FIELD information, which can be an indicator, so the operator know which farm was completed. A confirmation button is also shown.

Figure 11:
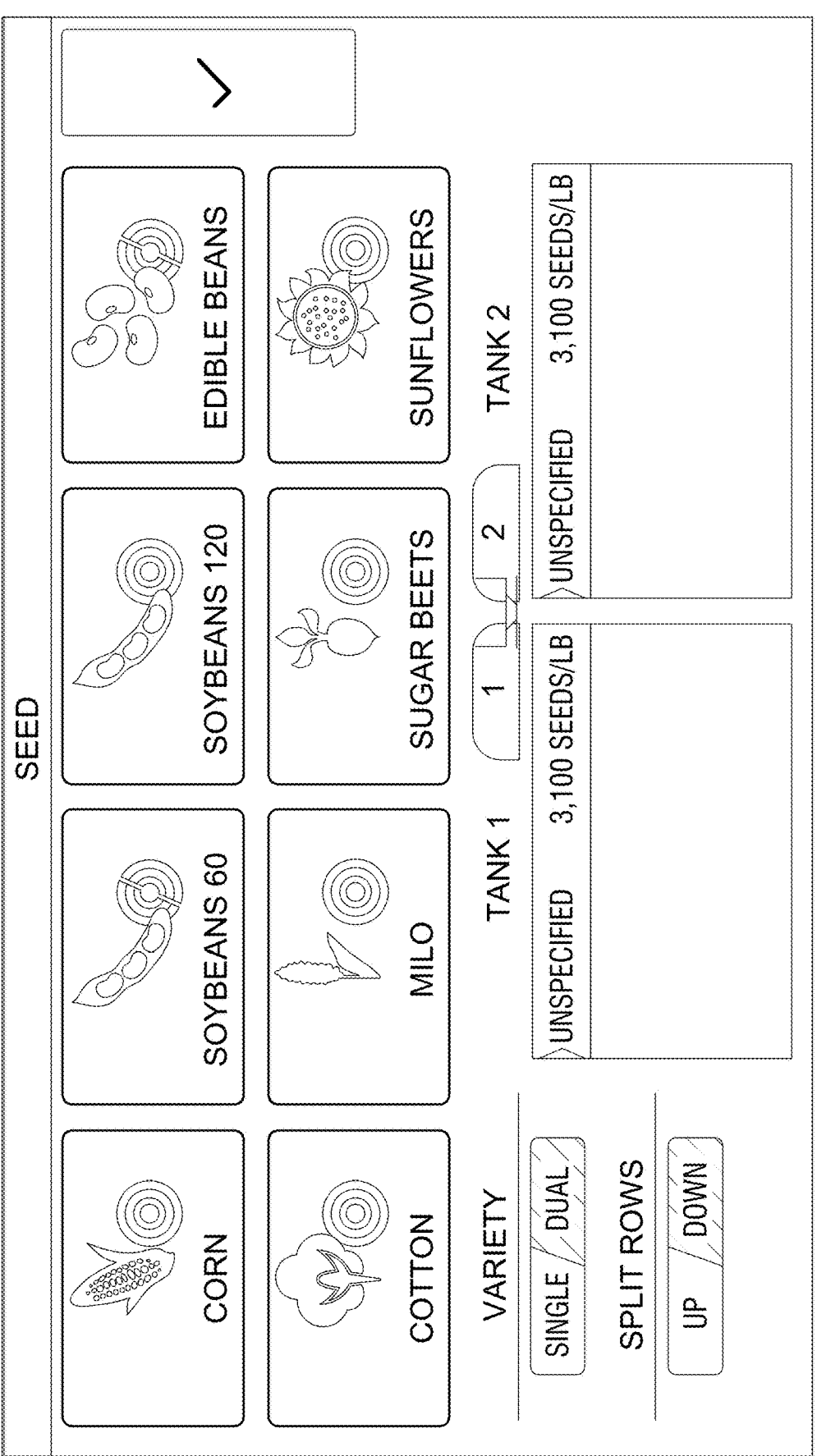

FIG. 11 shows options for which type of seed is to be planted in the field as indicated in FIG. 10. It should be noted that the seed types listed in FIG. 11 are for exemplary purposes, and are not to be limiting on what types of seeds can or will be shown in the display 10. Additional options include, but are not limited to, single variety planting vs. multi-hybrid planting, split row planting, and which seeds are located in which sides of the bulk tanks of a planter. The tanks can show an amount (such as in weight) of the seeds currently in the bulk hoppers.

Figure 12:
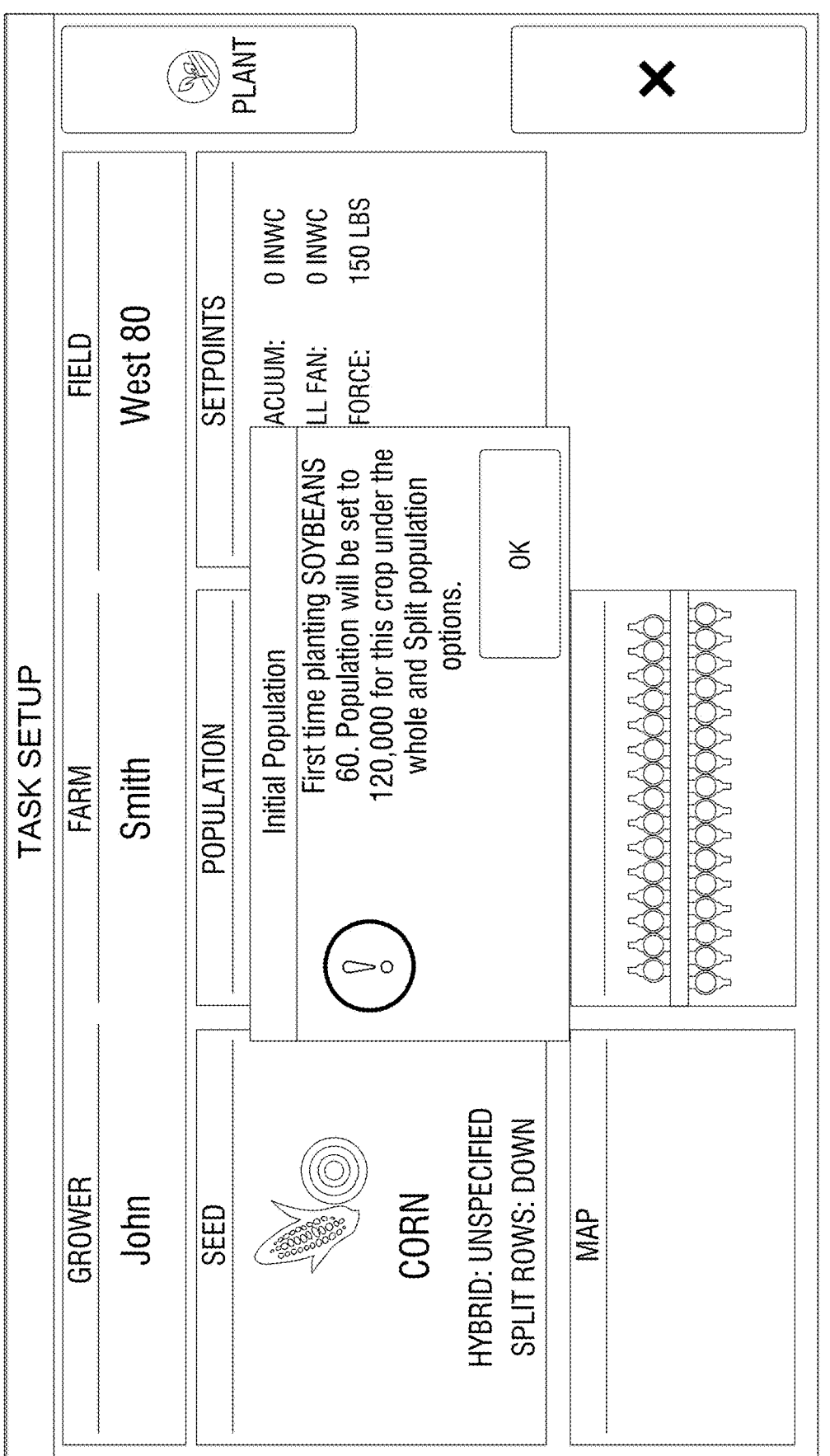

FIG. 12 shows addition setup for a task. The figure shows the information that has been input thus far. Furthermore, a popup screen is shown overlaying the main screen, and provides an ALERT based upon the selections made for the task. The operator can read the information of the alert and can dismiss the same by interacting with the OK button. However, this information could cause the operation to go back and make a change or confirmation as to the setup selections made thus far. As will be understood, this type of alert is tiered such that it is simply providing information, and does not require any changes to be made. The alert can simply be dismissed. However, if everything looks acceptable, the PLANT button at the right of the screen can be selected to begin planting of the field with the seed type and other selections made. A cancellation button, in the form of an X, could also be chosen to start over.

Figure 13:
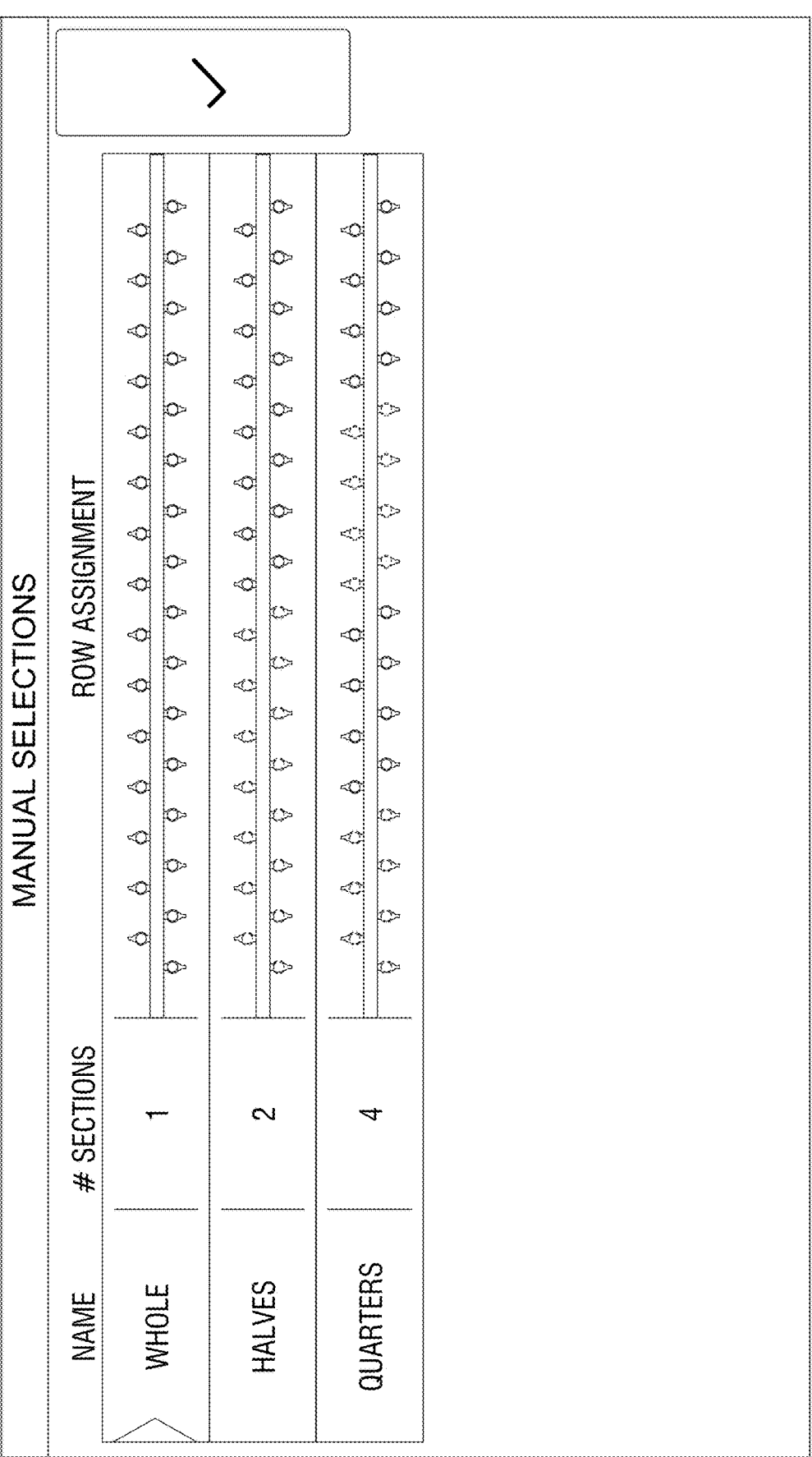

FIG. 13 is a view of Manual Selections that can be made to the rows.

Figure 14:
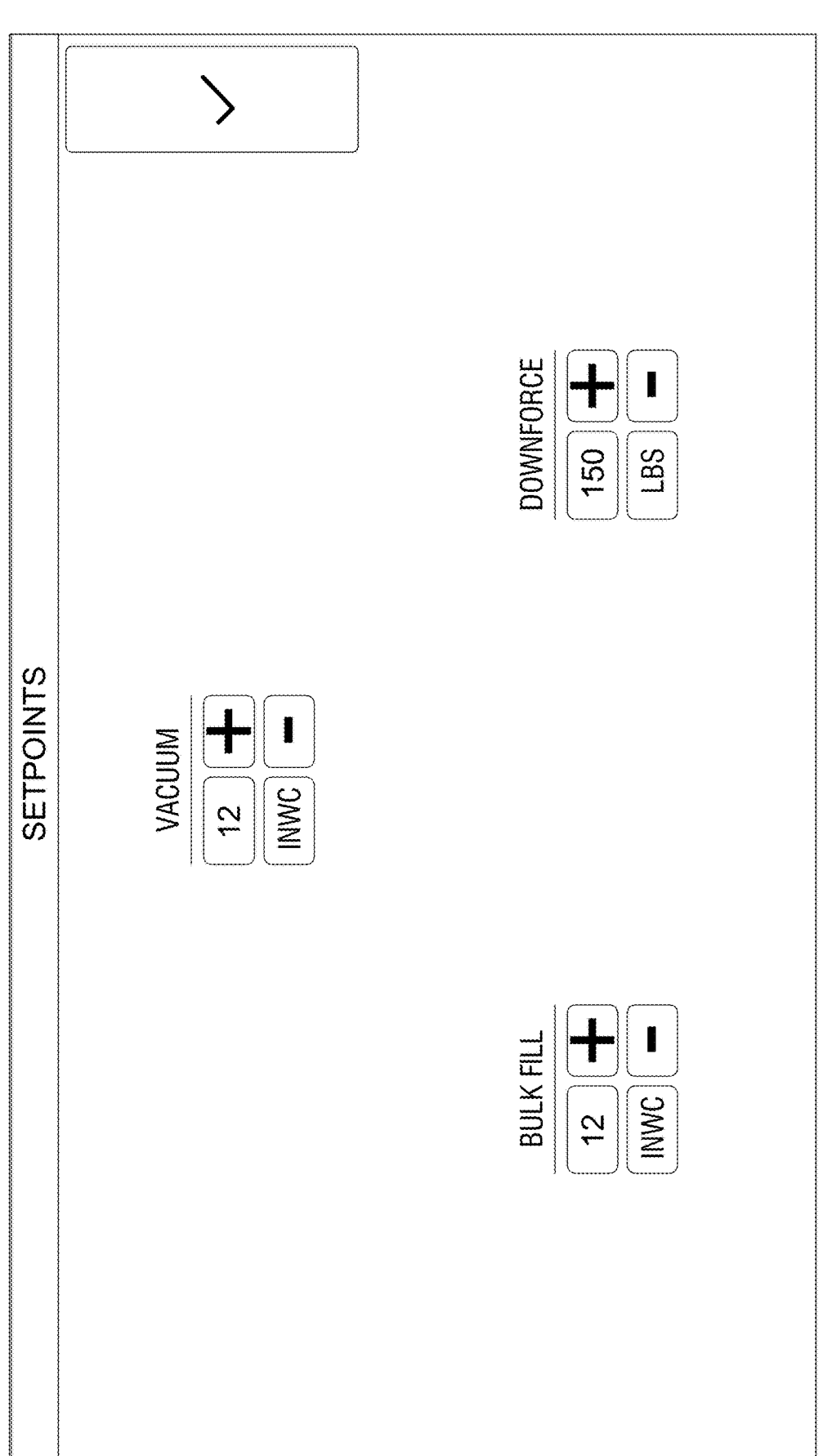

FIG. 14 is a SETPOINTS screen that allows the operator to set, at least initially, the setpoints for at least some of the planter operations. For example, the figure shows that the pressures of the vacuum for the seed meters and the bulk fill (seed delivery system) can be set incrementally, such as by integer. This is set up to be in "inch of water", but this could be changed per location or preference. Furthermore, the initial downforce setting could be set up incrementally, and is shown to be in pounds. These settings can then be confirmed by the button on the right of the screen 14.

Figure 15:
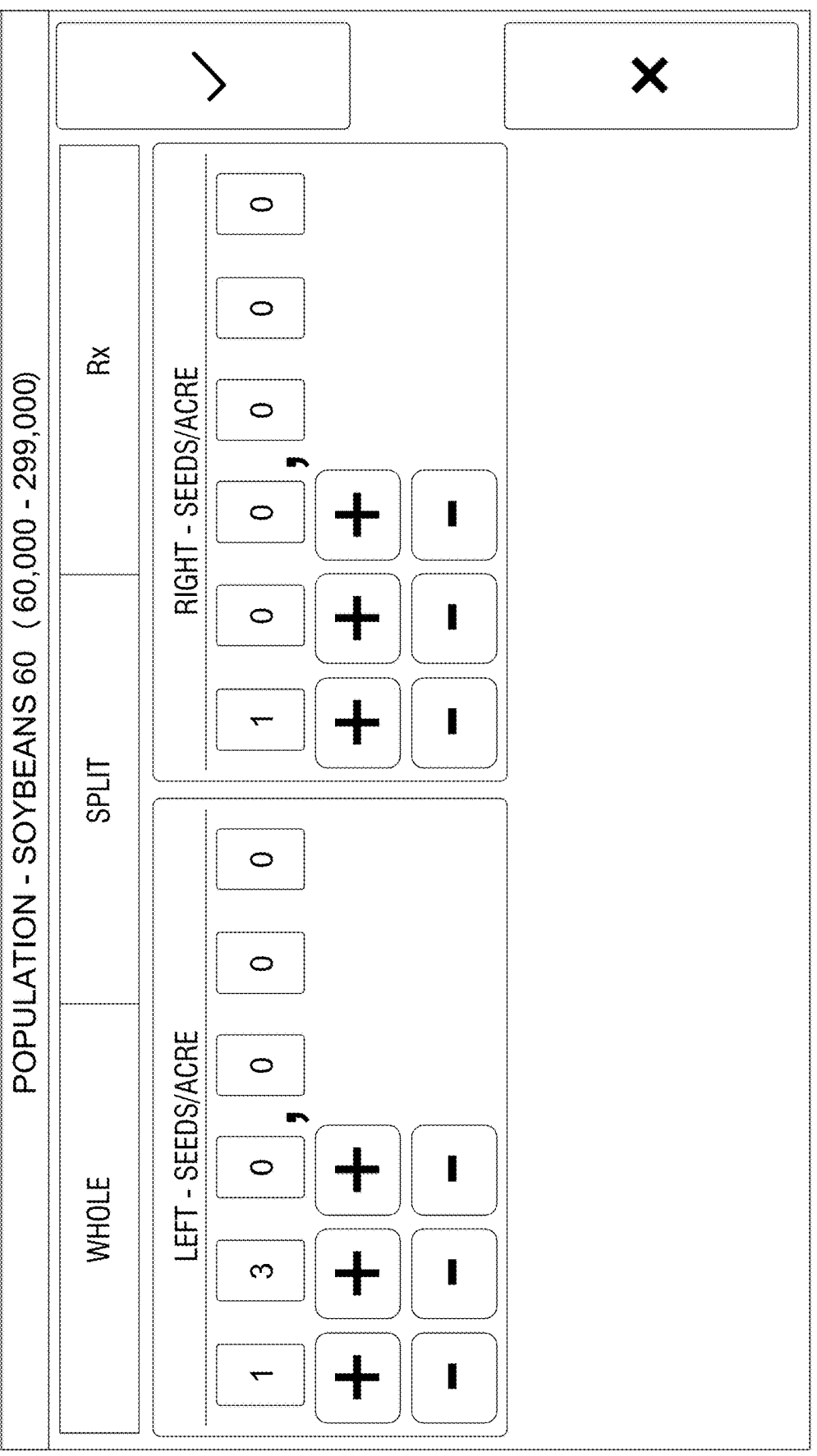

FIG. 15 is an exemplary embodiment showing the population settings for planting soybeans 60. The screen 14 shows that the planter can be set up by whole, split, or Rx. The population of the seeds planter per acre can be set by incremental dials. Further, based upon the seed type of soybeans 60, the population is restricted to be set between 60,000 and 299,000 seeds/acre. The selections can then be confirmed or canceled.

Figure 16:
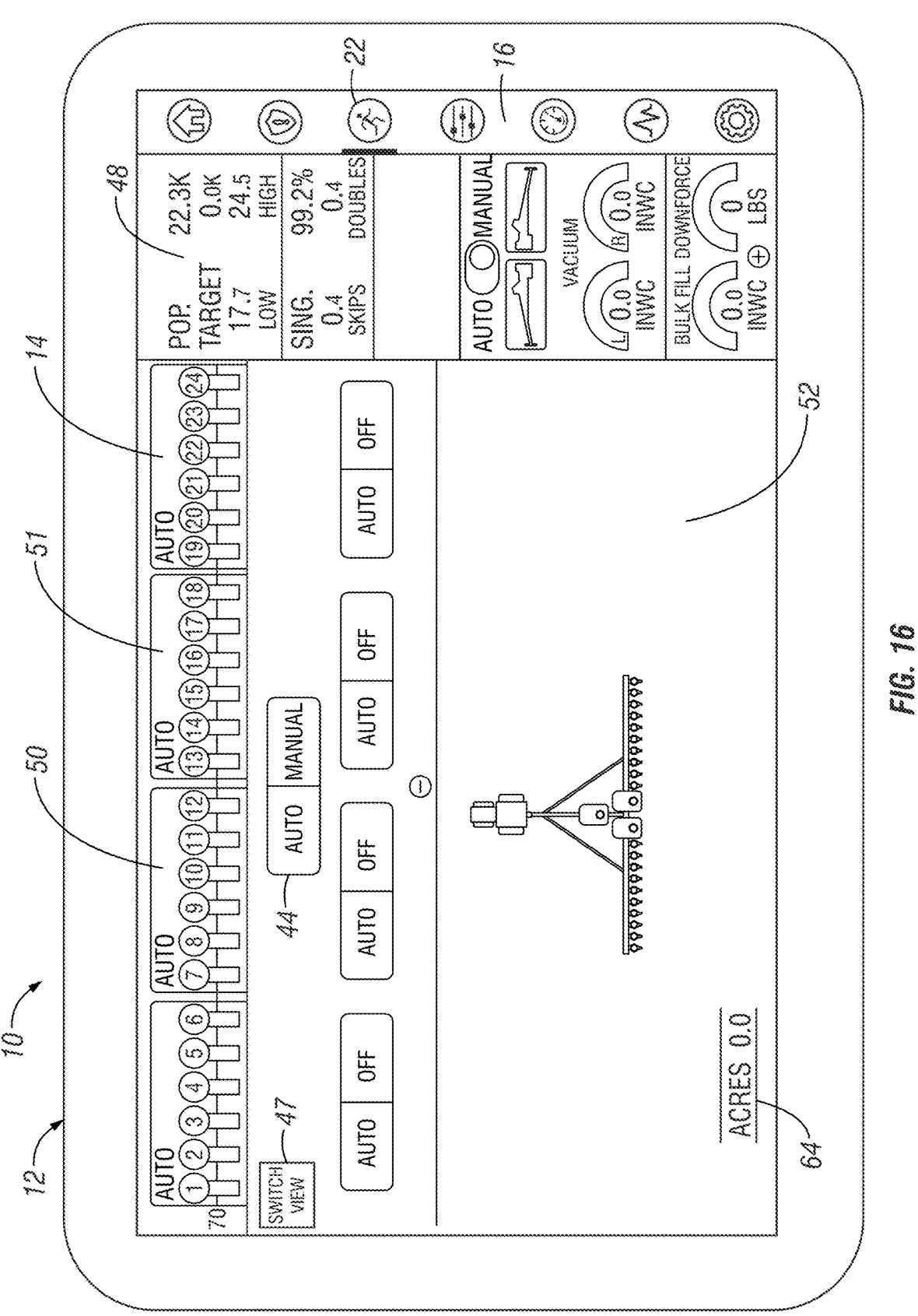
FIG. 16 is an exemplary depiction of a run screen of a display unit showing information related to the operation of an agricultural implement.

The screen 14 of the display unit 10 shown in FIG. 16 provides an exemplary screen associated with the run or operation button 22 in the action bar 16. The run button 22 is associated with the operation of the planter as the planter moves through the field, such as after the initial setup has been completed. Therefore, the screen as shown includes different information than the set points as was shown in FIG. 3. For example, the screen 14 shown in FIG. 16 includes a view of the field 52 including an exemplary implement and tow vehicle moving through said field. The field 52 can include color gradients, such as to show an operation of the planter as it moves to the field. Such an operation can include but is not limited to turning a color when a seed has been planted by the implement shown in the screen on the field 52. This can indicate whether a portion of the field has been planted or still needs planted. The inclusion of the color gradient in the graphical user interface of the display unit 10 also provides for showing different colors within the screens. For example, the field 52 can be different colors or shades of colors to indicated additional items, such as the type or hybrid of seed that is planted as the implement moves through the field. Still further, a certain color, such as red or otherwise can be indicated on the screen if the implement interacts with an obstruction, such as a rock which may have caused an issue with regard to an operation of the implement as it moves through the field. Therefore, the color gradience allows for greater information to be displayed via the display unit screen 14. The field 52 is also moveable via input, such as touching of the screen. For example, an operator can move or slide the tractor within the field view 52 relative to the screen to provide additional viewing of the field which may not be shown in the default field view. This can also include zooming in or out of the field view 52. For example, pinching or spreading of the fingers can allow for zooming or widening of the screen to show more or less of the field and the location of the implement relative to the field. This can indicate or allow the operator to determine relative location of the implement within an area of the field. Still other information in the field 52 can include a distance marker or quantity indication 64. As shown in FIG. 16, the indication takes the form of the number of acres travelled/planted, such as since resetting or starting operations of the planter in the field.

Additional portions of the screen 14 as shown in FIG. 16 include the expandable subscreens 48, which are similar to those shown in FIG. 3. Also shown are a plurality of toggle buttons 44 which allow for and/or are associated with row unit sections 51. For example, the toggle buttons 44 shown in FIG. 16 can operate the row units that are within the sections 51 as shown. For example, one section of the row units includes row units 1-6 as is shown by the lollipop style symbols in FIG. 16. The toggle button including a similar color to the surrounding the section of row units for row units 1-6 provides the options of auto or off. This auto or off button selection can be associated with the set points as previously indicated, such as shown in FIG. 3 to provide for the automatic planting or turning on or off the row units of the section. Still further, interactions with the individual row units that are numbered on the screen can provide for and inputting or changing a set point, rate, or other operation of the individual row unit itself. Yet still further, the lollipop style symbols associated with or icons associated with the row units can provide feedback to an operator, such as by color feedback or sound feedback, which may indicate when an issue arises with a particular row unit. For example, in the lollipop styles icon as shown in FIG. 16, an icon for row unit 5 may turn red if there is an issue with said row unit, which will indicate to the operator they may need to investigate the row unit as there may be damage done or something else that needs to be done to said row unit. Still further, the screen 14 in FIG. 16 includes an action button 47 which is a switch view button which will toggle between multiple view showings similar information associated with the run operations screen.

Figure 17:
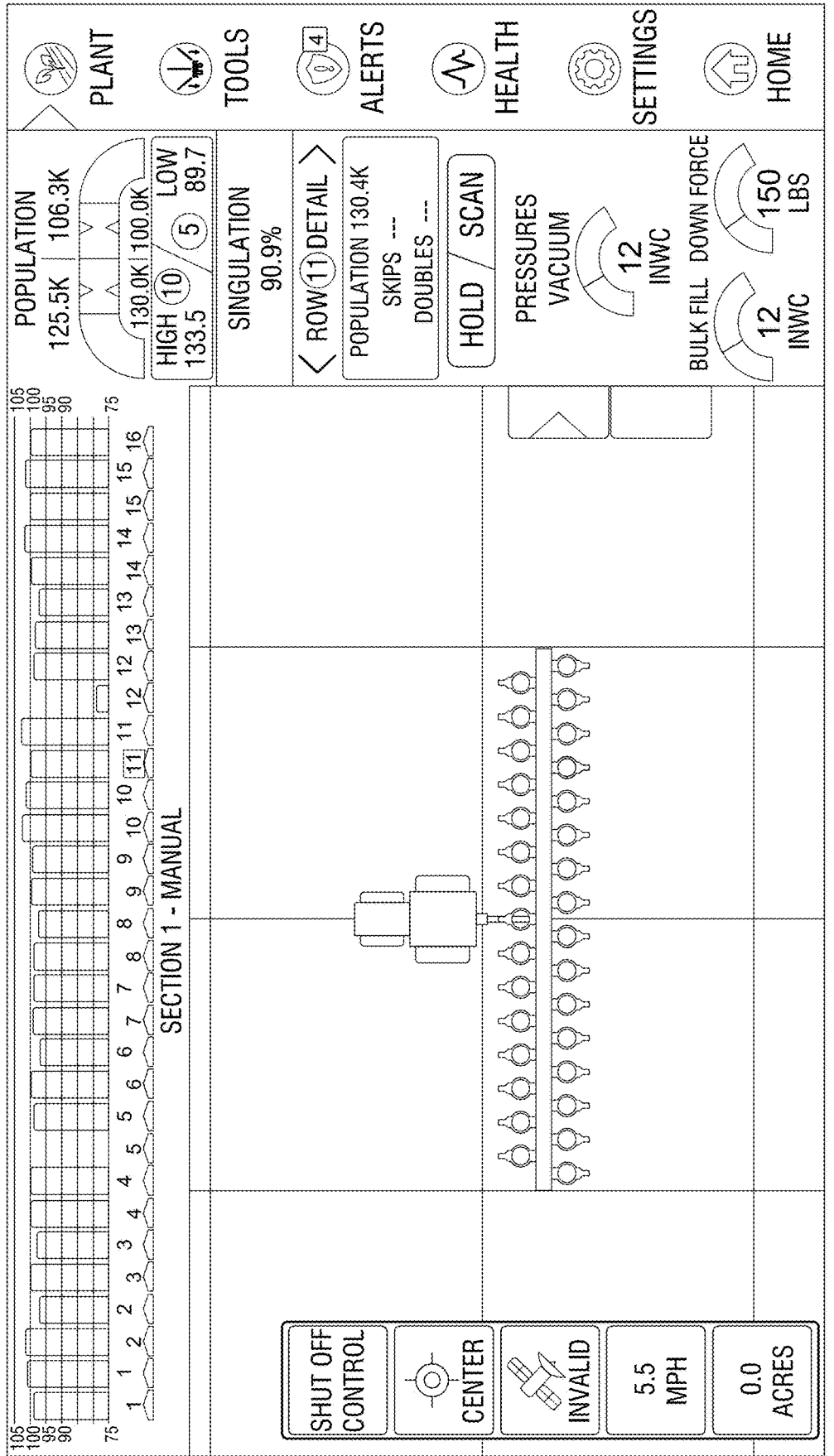
FIGS. 17-18 are exemplary plant screens of a display unit showing information related to the operation of an agricultural implement.
Figure 18:
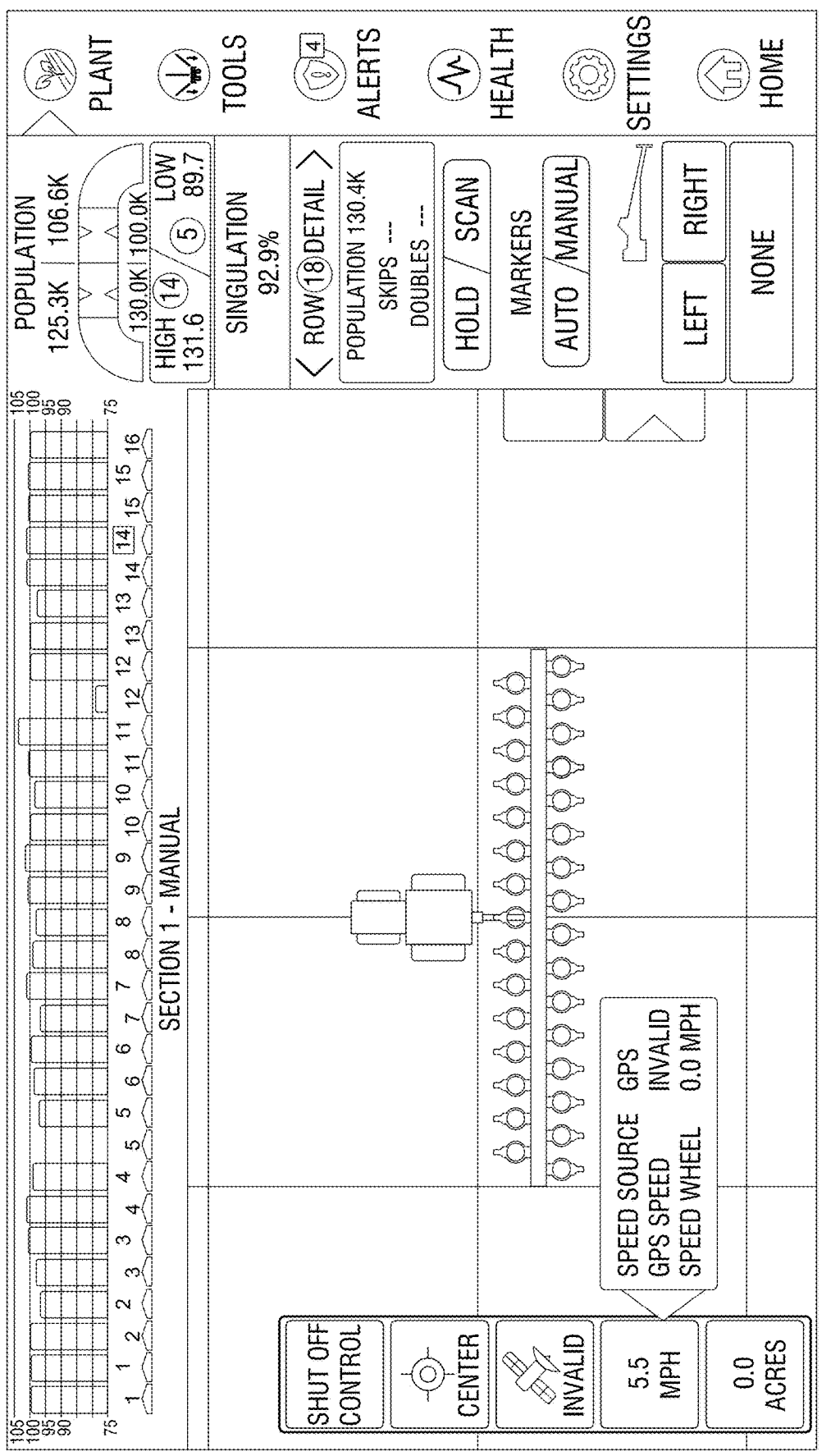

FIGS. 17 and 18 are addition views of a screen 14, which show the screen in the PLANT action item. This is similar to the RUN button of FIG. 16. Therefore, the information provided in FIGS. 17 and 18 are similar to that of FIG. 16, but the layout is a little different. For example, instead of lollipops for the rows, bars are used. However, the other information, such as population, singulation, and pressures are still shown and can be adjusted. Additional information related to shut off control, center, invalid, speed, and acre count is also shown. The center relates to the map shown to re-center the depiction of the implement moving on the map shown. As shown in FIG. 18, interacting with the speed box in the lower left-hand side will provide an information bubble to shown that the speed sources may provide different speeds. However, in the instance shown in the figure, GPS is providing the speed of the implement.

Figure 19:
FIG. 19 is a depiction of a blank screen.

FIG. 19 shows an exemplary screen which does not have a screen layout or any graphics shown thereon. As is shown, the screen is incomplete and that it has not yet been assigned any icons, symbols, or any other inputs or outputs. The screen shows a generally blank screen 14 surrounded by the housing unit 12 of the display unit 10. However, there is a back button 54. For example, if an operator chooses a selection which is not associated with the planter connected thereto, a blank screen may pop up or may be provided to alert the operator that there is no action associated with their input or selection. This may be an indication that the planter associated with the display unit 10 does not have a functionality that the display unit is capable of showing for other planters. In such a situation, a blank screen or other screen may come up to the operator to return to the previous screen in order to choose a different selection. Therefore, instead of saying this screen in incomplete, the screen may simply be blank with the back button showing, which will indicate to the operator to input the back button 54 to return to the previous screen shown and to make a different selection.

It should also be appreciated that the blank screen with the back button 54 as shown in FIG. 19 is but one type or tier of screen that may occur based upon an input or selection or input of the screen. It is contemplated that the display unit 10 includes tiered screen responses based upon an action chosen by an operator. Such tiers can include one of many responses, which can require no or some action in order to revert the screen to a pervious display. For example, it is contemplated that a first tier be a pop up or pop out screen where only a portion of a window is expanded upon a selection by an operator. Such first tier can include an explanation or information type dialogue window within the screen which can be removed after a set amount of time and/or an input required by the operator. For example, the first tier of screen can simply be an information dialogue window, but the operator may know of information associated with the input, which may be a clock, a timer, a direction, a weather setting, or some other informational type graphics and/or other information which may be temporarily desired. The first tiered window will expand for a set amount of time and then will be reverted back to the previous screen, and can be expedited via the interaction of the operator with the screen.

A second variation of tier is contemplated which may be a pop up or pop out type screen which covers a portion or all of the screen 14 of the display unit 10. Such second tier may require an action of the operator in order to revert the screen to the previous display. For example, such a second-tier item may be an alert or a caution based upon a selection or other input and which will not be removed from the screen until the operator acknowledges such caution and presses a button to revert the screen back to the previous screen. This can be an alert such that the rate of elevation has changed to alert or suggest a changing of speed of the tow vehicle and/or implement based on said elevation change and which can be ignored, if chosen, by the operator. However, the second tier can also include a short cut button to allow the operator to go to a screen that will allow for the change based on the suggestion or caution of the second-tier window.

Still further, a third tier is contemplated, which includes a change of the full screen of the display unit 10. Such a change in the full screen is similar to that of when selecting or inputting one of the action bar 16 buttons. This could also be an automated screen change that signals an alert and that is not in response to an input of the operator. For example, an alert related to the potential damage or possible damage of a portion of the planter and communication display unit can pop up to alert the operator that action is needed and should not be taken lightly. Therefore, the screen will change to the alert until the operator has taken the action, such as to address the situation shown by the alert, or to press another selection associated with alert, such as snoozing the alert. Such snoozing will allow the operator to acknowledge the alert brought on the screen of the display unit 10, while postponing the addressing of the alert at that moment. This can be to allow the operator to finish the operation or to get to a location where the alert can actually be addressed in a safer manner. However, the snooze function of the display unit will not forget that the alert has occurred, and will remind the operator after a slip amount of time such that the possible issue does not go unaddressed. Still further, options may be shown via the third-tier screen.

Additional tiers and or sub-tiers may be envisioned in which the screen layout, options, inputs, graphics, information, or otherwise is changed either automatically or based upon an input or other selection of the operator. Some tiers may require an action by the operator for the screen to be changed, while others may be time based. Still other tiers may change after an action has taken place. For example, travelling above a speed parameter or threshold may cause a screen pop-up or other alert to appear until the speed is changed to within an acceptable range. Thus, no direct interaction with the screen 14 was needed, but the screen alert or pop-up can still require a change in operation of the tow vehicle and/or towed implement.

Figure 20:
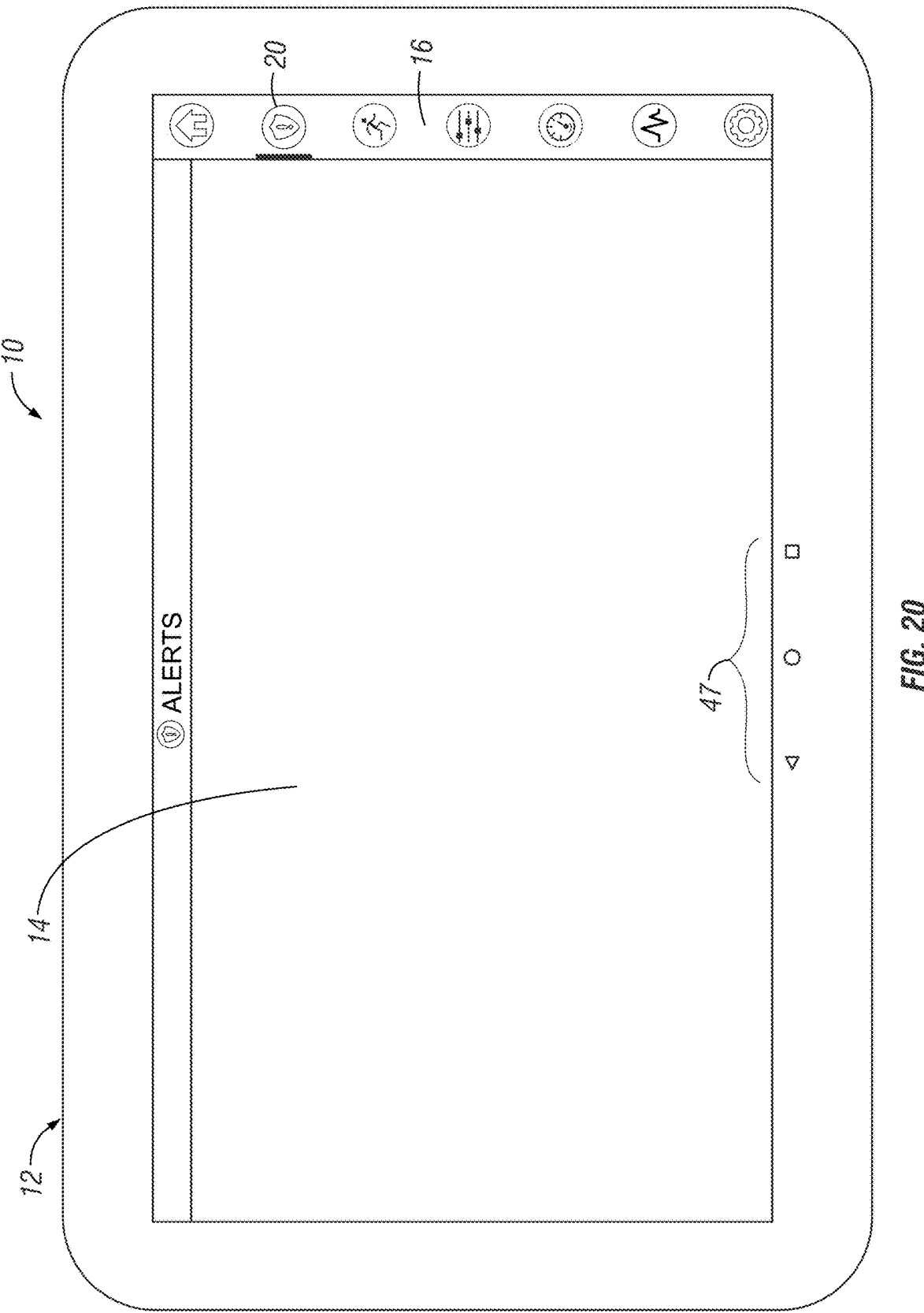
FIG. 20 is a depiction of a blank alert screen.

FIG. 20 shows yet another exemplary display of the display unit 10, which is a blank screen on the alert portion 20 of the action bar. However, the figure also shows a number of action buttons 47 which are located on the housing 12 of the display unit 10 and not on the screen itself. Such action items can be additional buttons 47 which will provide additional functionality forwarded the display unit 10.

FIG. 21 is another exemplary depiction of an ALERT screen. As shown along the action bar 16 at the right-hand side of the screen, the ALERT icon includes a number in superscript form. This number can correlate to the number of active alerts that need attention. As shown in the main portion of the screen 14, there are four (4) active alerts and six (6) total. The alerts have varying levels, as indicated by the icons to the left of the Alert Details. The levels can correlate to the tiers as discussed herein and can be removed if they are unnecessary or once they have been addressed. The Alert Details provides information related to the alert, such as location and what the problem may be. This allows a simple direction to address the alert. Furthermore, towards the right of the screen, date and times are provided. These correlate to when the alert was diagnosed, which allows a technician to know how long the issue has been going on, and if this could have affected or caused any other issues. The information can be time stamped and stored for later determination, such as settings used in relation to field/seed types, to attempt to troubleshoot any of the situations raised by the alerts. Therefore, the ALERTS screen provides vast knowledge in both real time and for future use.

Figure 22:
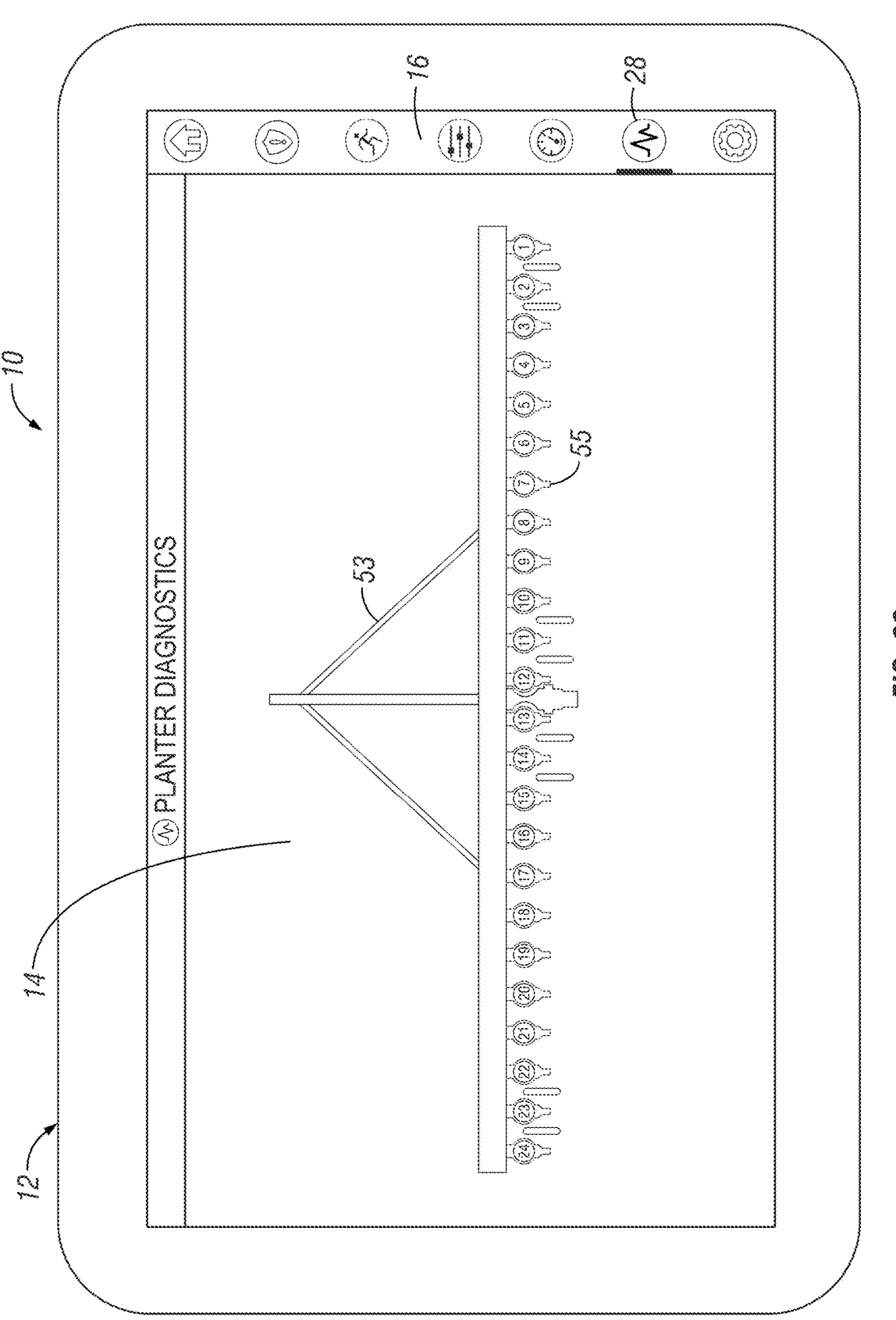
FIG. 22 is an exemplary planter diagnostics screen of a display unit.

FIG. 22 is an exemplary display of a screen 14 of the display unit 10 showing planter diagnostics associated with the planar diagnostic button 28 of the action bar 16. In the planter diagnostic screen, the display unit 10 can show an icon or graphics associated with the planter in communication with the display unit 10. These can include synoptic views of the planter or other implement 53 to provide diagnostics and/or trouble shooting for the implement 53. For example, the implement 53 shown in FIG. 22 is a planter with a plurality of row units 55. The planter diagnostics screen as shown in FIG. 22 can show if any of the row units 55 need addressed, such as repaired, replaced, or other trouble shooting and can be selected, such as pressing (or otherwise selecting) the actual row unit to provide for additional information. For example, if the row unit numbered 20 where blinking, or otherwise shown in a different color than the rest of the row units, the operator may press said row unit 20 and one of the tiered screens may open additional information associated with row 20. This can include, but it is not limited to a jam or obstruction in the row unit, or other errors which may affect the operation of the row unit 20. Instructions or other information (dealer or repair numbers, reference to manuals, or otherwise) can then be given to show what is needed to be done to row unit 20 in order to return to normal operations.

Figure 23:
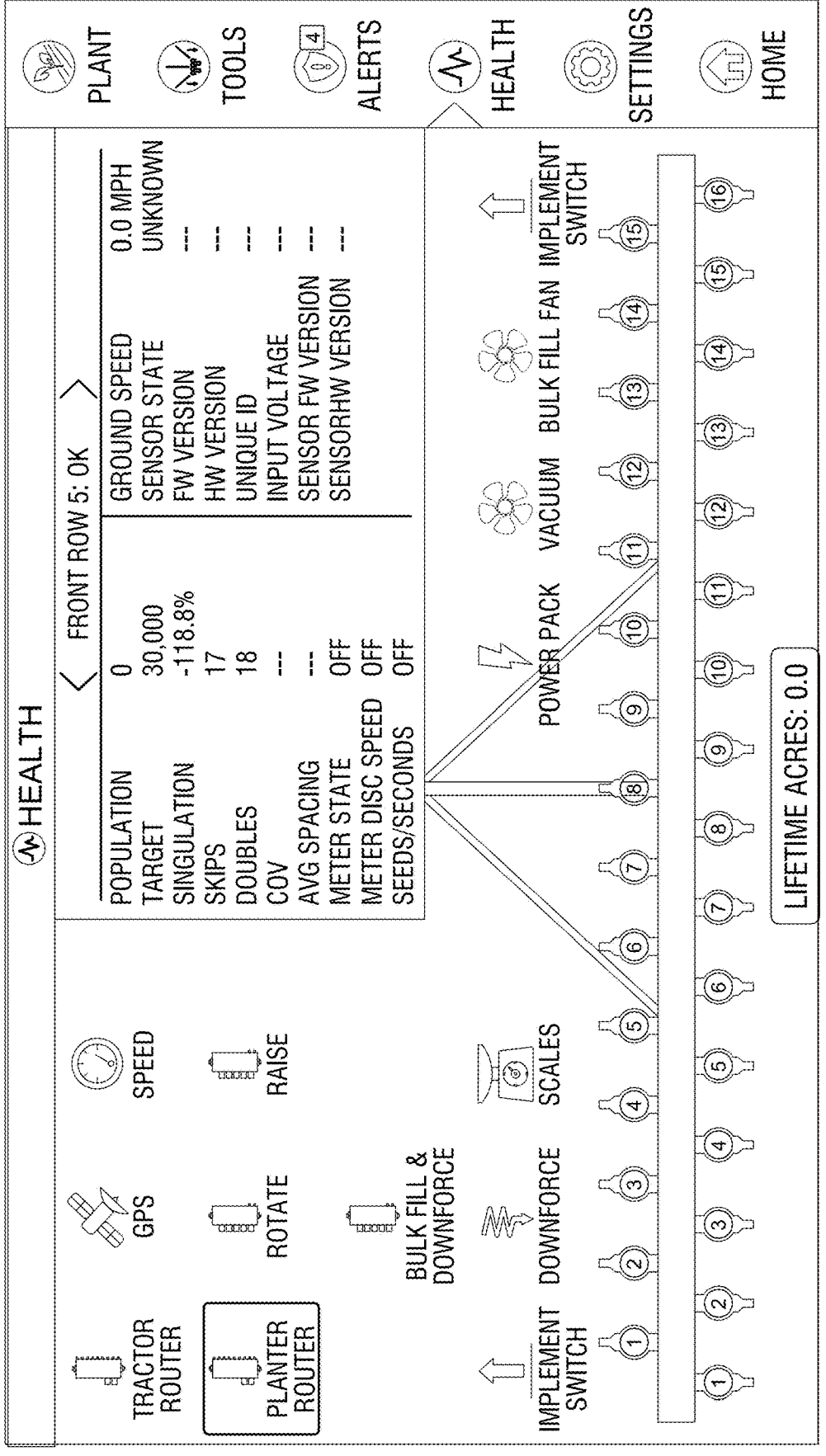
FIGS. 23-24 are exemplary health screens of a display unit.
Figure 24:
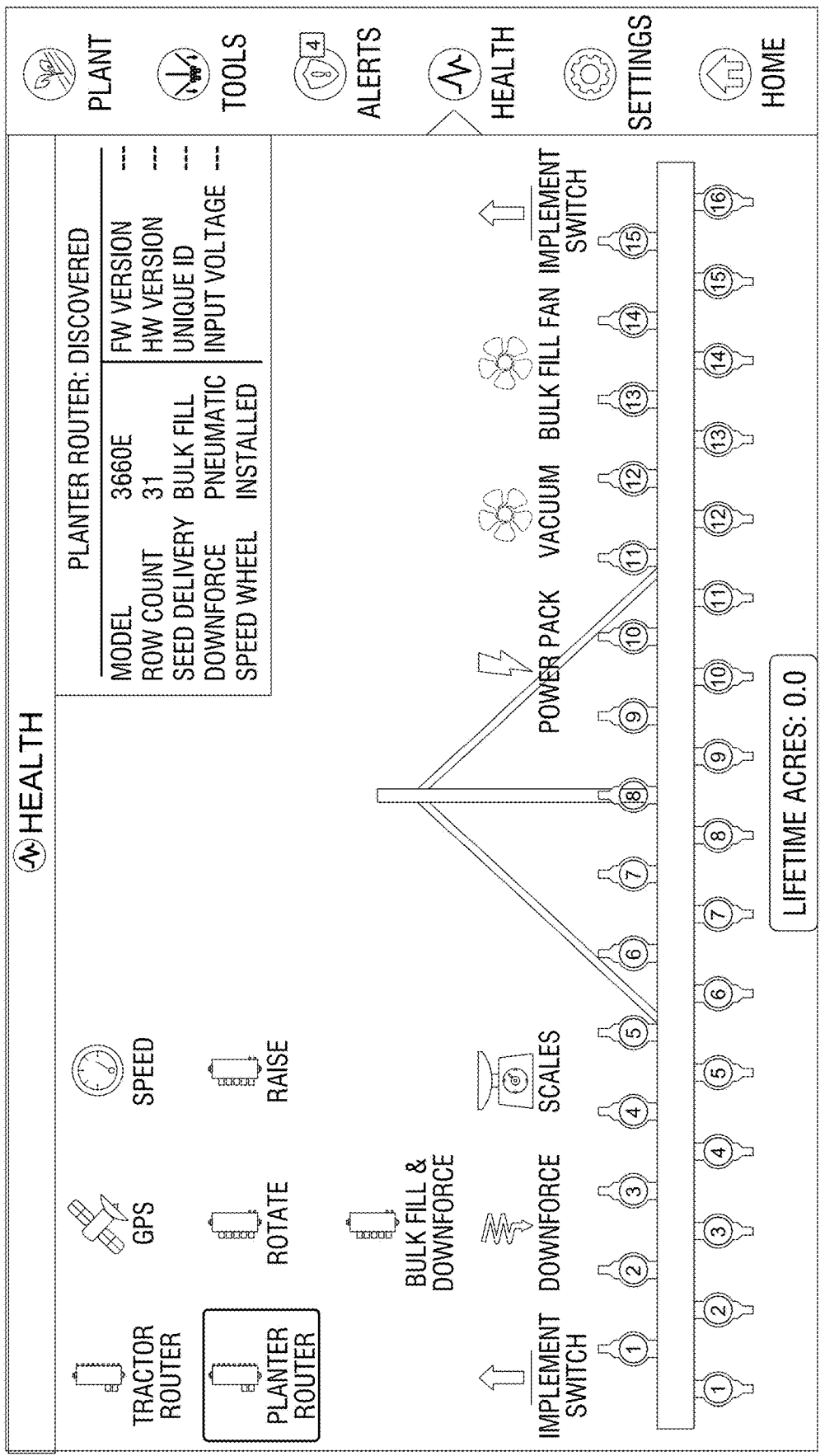

FIGS. 23 and 24 are additional embodiments, aspects, and/or depictions of a screen 14 showing HEALTH information. As noted, the HEALTH icon along the right-hand side bar is selected to show such information. FIG. 23 displays exemplary information that could be provided by such a health screen. The pop up screen titled, "FRONT ROW 5: OK" would be shown when a user selects the row unit 5 on the front of the toolbar in the figure. The pop up screen shows information related to the selected row unit, including operational information and any setting information. This allows a user to look at the row units at a micro level to determine the operation and any issues associated with any of the row units. The information could provide real-time assurance that the row units are operating correctly, based upon the set inputs and/or settings. The information could also be stored for future purposes, such as determining which row unit planted a particular row of crop in case there was research for the crop, issues, or to prepare best practices for the future planting seasons.

There are additional icons shown on the screen 14 in FIGS. 23 and 24. The additional icons from health and/or diagnostical information related to the operation of a portion of the planter or implement identified by the icon. For example, the "PLANTER ROUTER" icon has been selected in the screen of FIG. 24. A pop up screen within the larger screen is shown and titled, "PLANTER ROUTER: DIS- COVERED". This shows that the particular implement has a router that is operational. The information under the title refers to the router itself and its operations. For example, the model number and settings associated with the router are shown.

Similar pop up windows would appear when any of the other icons are selected. Again, the information associated with any of the icons can be used to determine if the associated components are working correctly. The information could also be stored and reviewed at a later time to compare to resultant crop, to identify any issues and/or to plan for best future planting practices and configurations of the planter.

Figure 25:
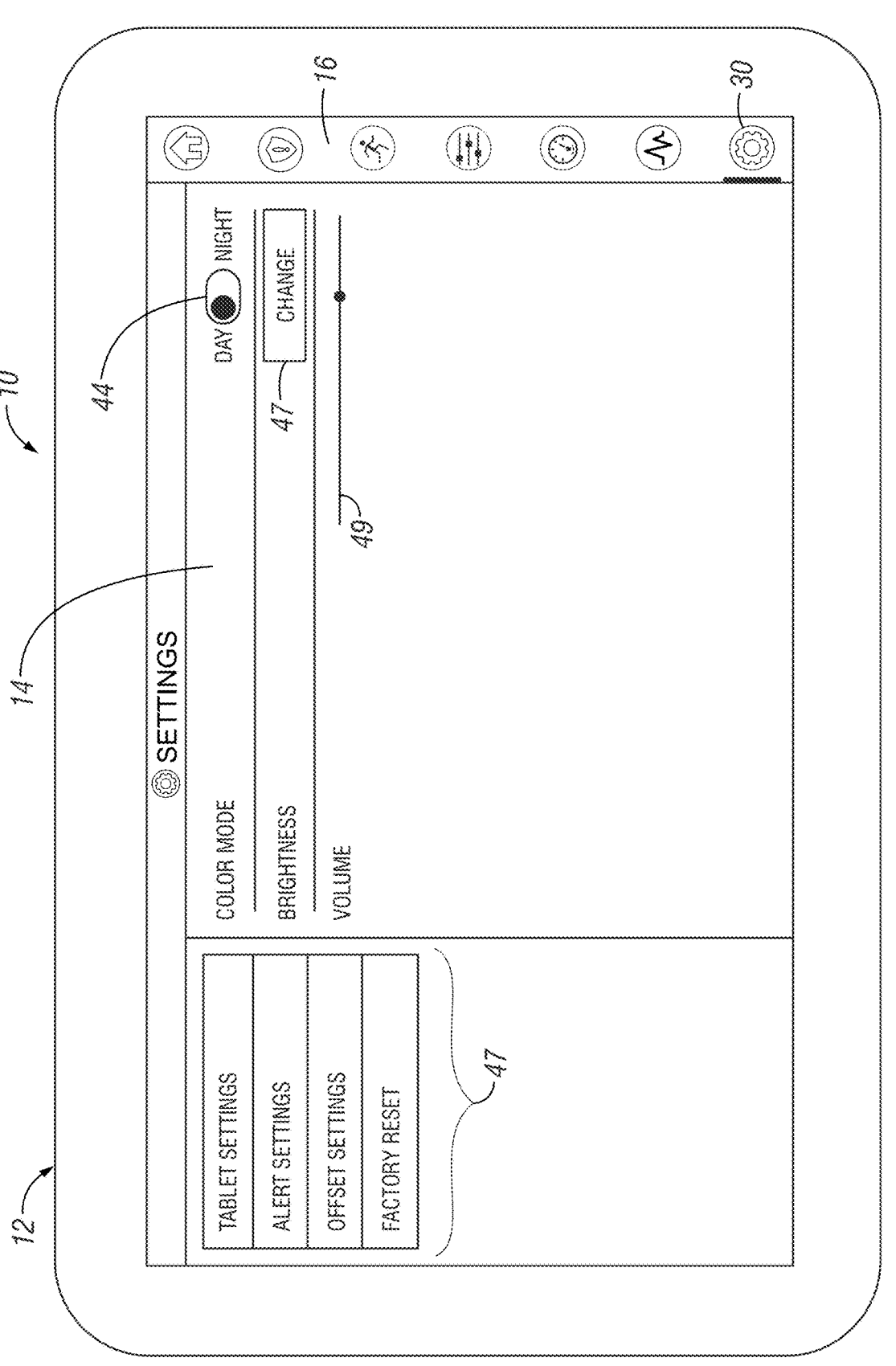
Figure 42:
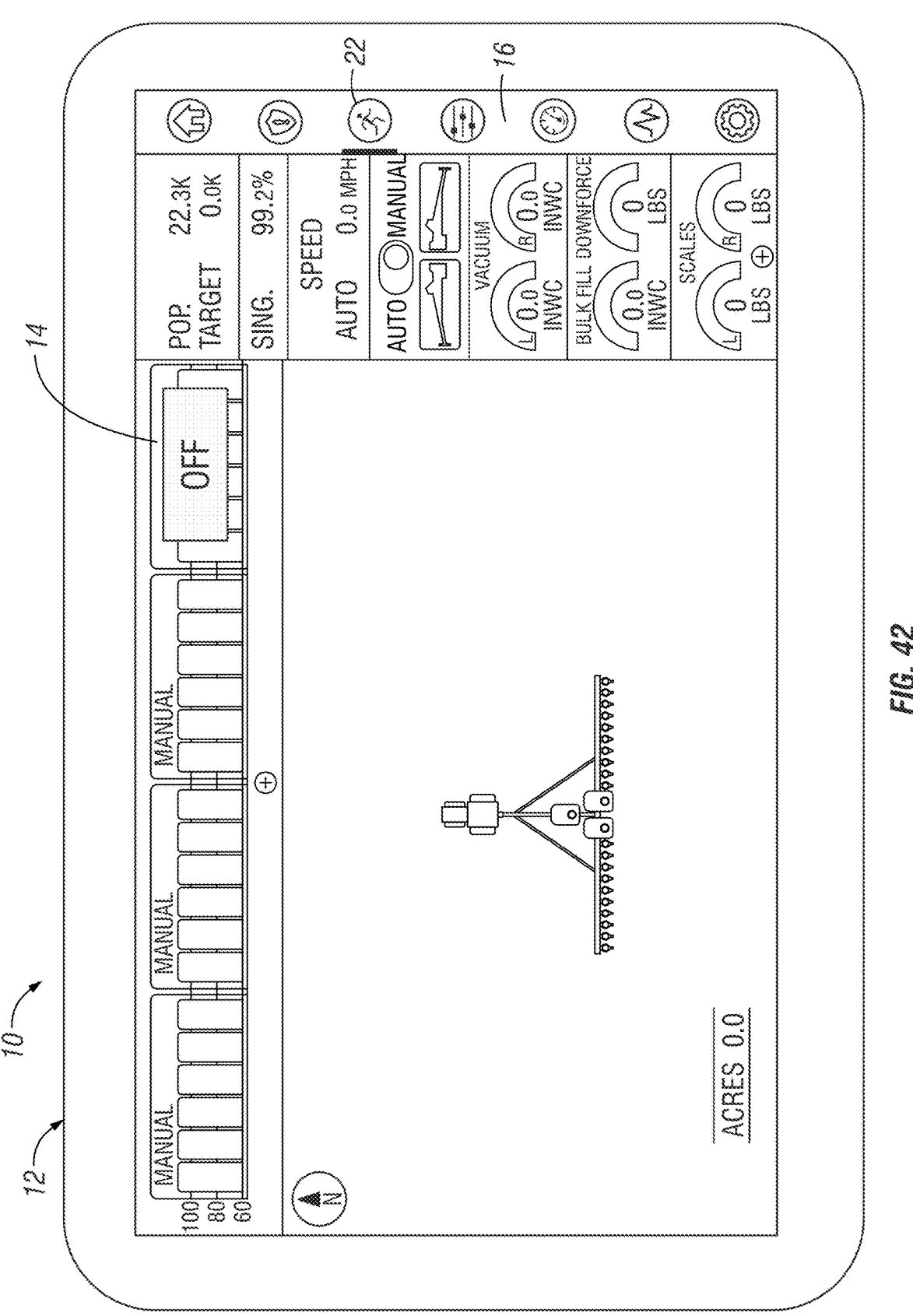
FIG. 42 is an exemplary view of a screen in a night setting according to aspects of the invention.

FIG. 25 is yet another exemplary in view of a screen 14 of the display unit 10. The screen 14 in FIG. 25 shows a screen associated with the settings button 30 of the action bar 16. The settings features may include settings related to the operation of the display unit 10 itself. As is shown on the left-hand side, there includes a plurality of action buttons 47, which will direct an operator towards different settings for the display unit 10. These include, but are not limited to, tablet settings, alert settings, offset settings, and/or factory reset. Selection of one of the buttons 47 will or can bring up additional options, which include additional input selections as well. For example, as shown in FIG. 25, the settings on the screen are associated with the tablet settings button on the left-hand side of the screen. These include settings related to the color mode, brightness, and volume of the display unit 10. The color mode includes a toggle switch 44 for switching between a day view as is shown in FIG. 25 and a night view, which is shown in FIG. 42. A night view will change the background color of the screen, such as by inverting the colors to allow for easier viewing of the screen in darkness or other night conditions. The brightness includes an action button 47 wherein the brightness of the background of the graphical user interface 14 can be adjusted based upon an operator's desire. Still further, a volume setting can be adjusted via a slide 49. The slide is an input including a line with a dot thereon. The dot will slide/move graphically along the line wherein movement to the left of the line will lower the volume output of the display unit 10, and movement to the right of the screen 14 will increase the output volume of the display unit 10. Therefore, the settings can be customizable to each user and/or operator to allow for the operation of the display unit 10 and for communicating with the associated planter or other implement.

Figure 26:
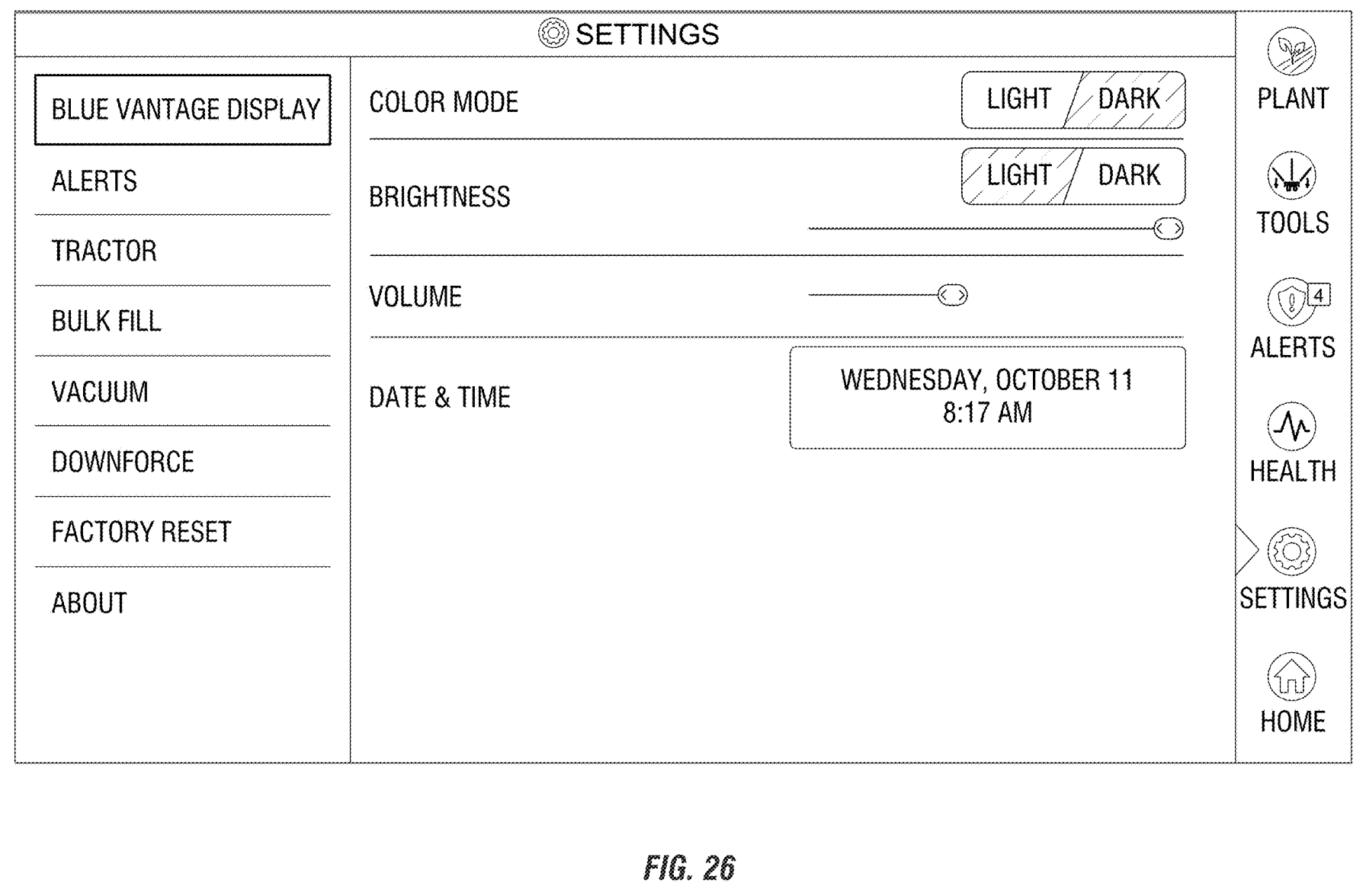

FIGS. 26-33 show additional screens 14 of exemplary display units 10 that appear when the SETTINGS icon is selected along the right-hand action bar 16. For example, FIG. 26 shows setting information related to the display of the unit 10. This can include color mode, brightness levels, volume, and setting the date and time. However, it should also be appreciated that the date and time can be automatically set, such as via wireless connection, and the brightness level can automatically be adjusted based upon ambient conditions. The color mode and brightness buttons are touch toggles, and the brightness and volume can also be slides to provide more infinite control.

Figure 27:
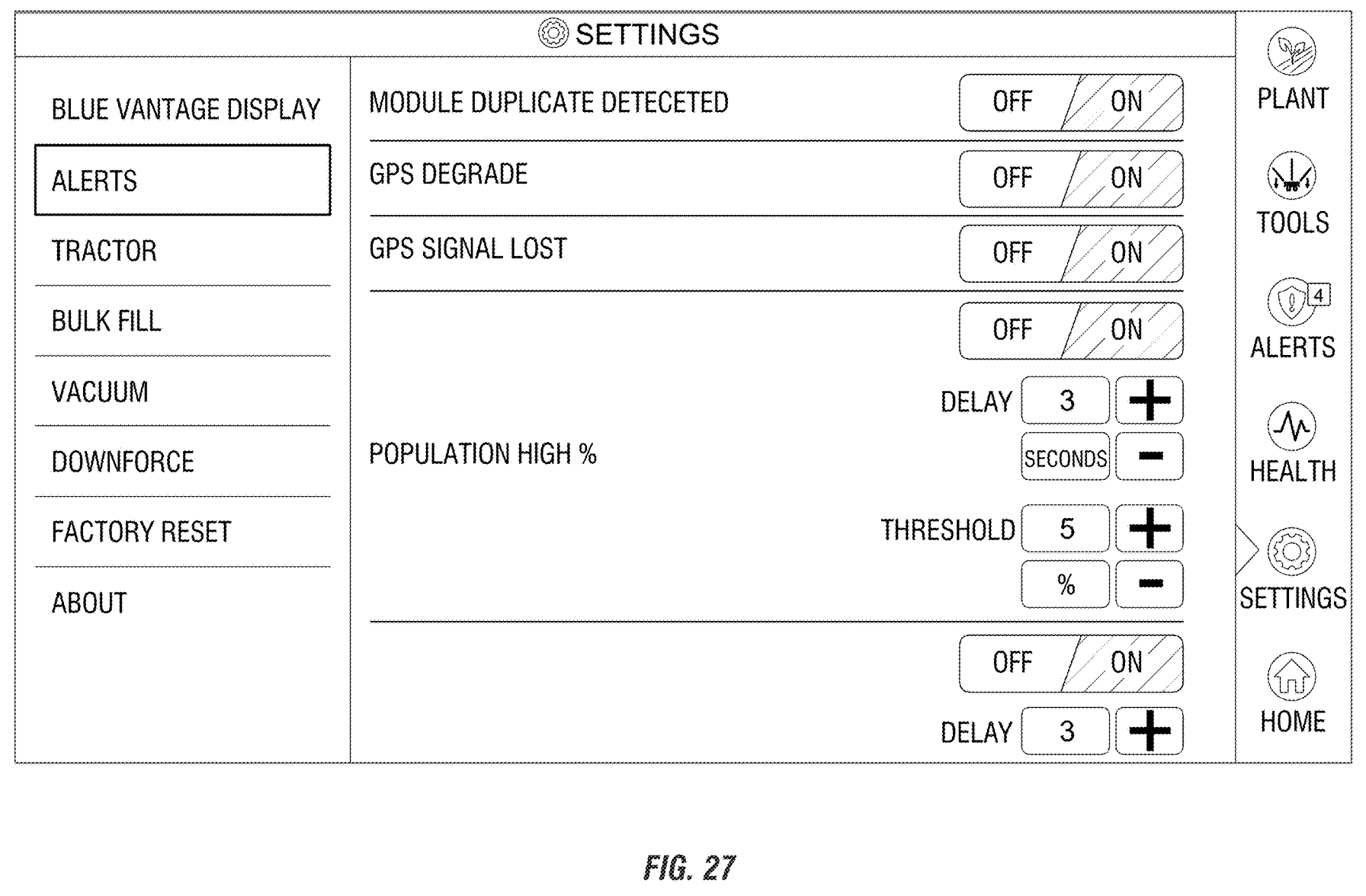

FIG. 27 shows setting choices related to alerts. These can include on/off inputs for some choices. Further, there can be incremental adjustments for delay time and threshold. Note further that the default unit for delay time is seconds, but this can be changed by interacting with the button. The same can be done for generally any other of the units of the display unit 10 as well. This can be pressure, rate, speed, time, amounts, weights, mass, volume, pressure, etc. Any of the items that include units can changed based upon personal preference and/or location (e.g., changing SI/metric units to imperial units and US customary units).

Figure 28:
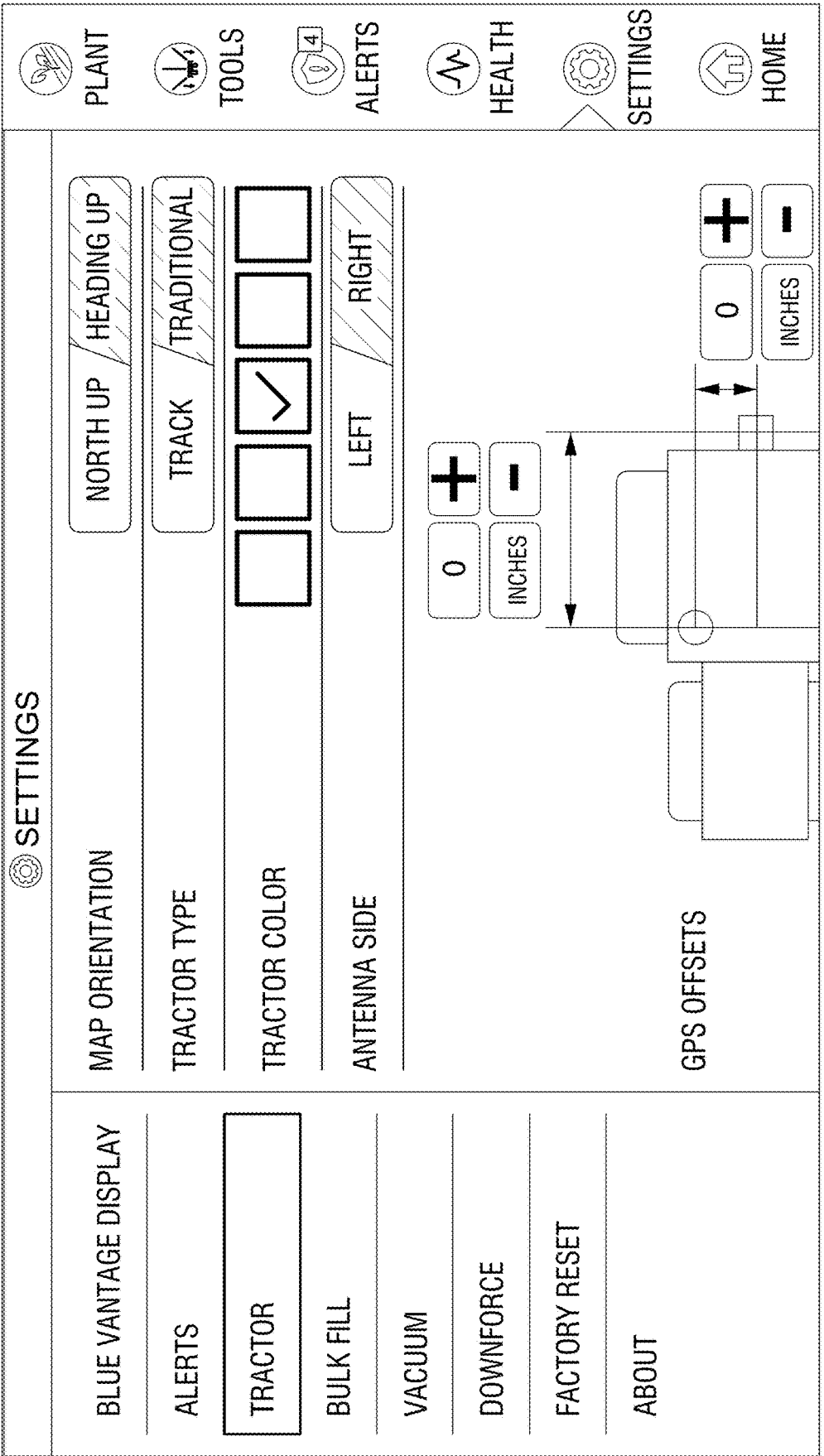

FIG. 28 shows exemplary settings related to the tractor or tow vehicle. These may be related to the setup of the tow vehicle, as well as the look of the tractor or tow vehicle in any of the screens, e.g., the screen shown in FIG. 17. The personalization of the tow vehicle allows the user of the display unit to feel like their tractor is being shown on the screen. Therefore, the tractor type (wheels vs. tracks), color (brand), and antenna side can all be personalized. The user can also personalize any maps shown in the screen to their orientation preference (north up vs. heading up). Still further, GPS offsets can be set up if required.

FIG. 29 provides for settings related to bulk fill of the planter. This includes setting up the pressure sensor, such as by setting a pressure.

FIG. 30 provides exemplary settings related to vacuum pressure, including the zeroing or calibration of the vacuum pressure.

FIG. 31 provides exemplary settings related to downforce pressure, including the zeroing or calibration of the downforce pressure.

FIG. 32 is an exemplary SETTINGS screen showing reset options. The screen provides touch buttons to reset any of the setpoints, alerts, speed tools, and/or tractor settings. If the display unit is to be sold, there is an option to clear all data of the unit 10, such as by swiping an icon from left to right. This is shown as a trash can in FIG. 32, but other options may be available.

Figure 33:
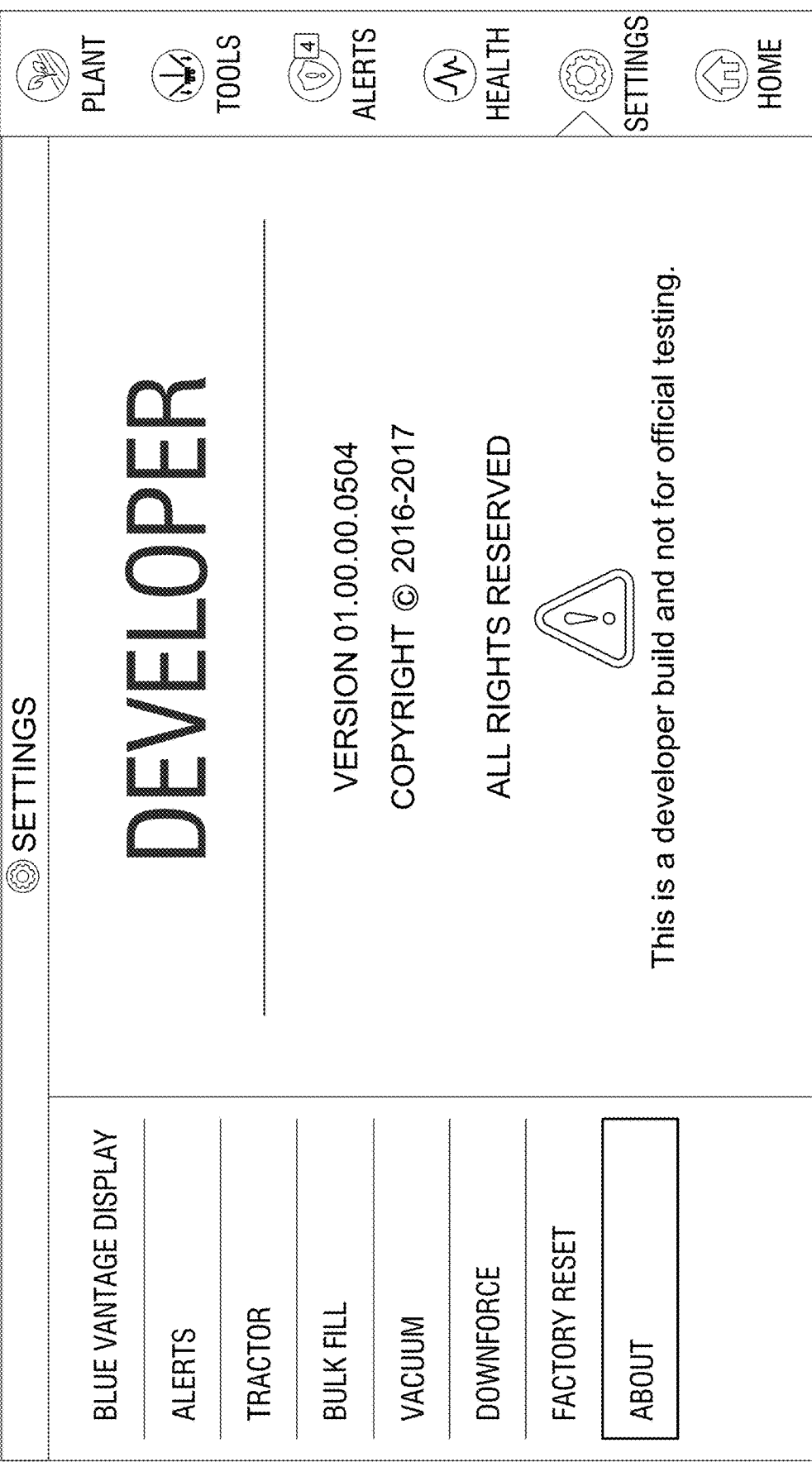

FIG. 33 shows information in the SETTINGS screens related to display unit itself. Such information may include information related to the manufacturer of the unit, the version of the unit, any copyright information, as well as any other information that may be informative, restrictive, or otherwise affect the use of the display unit.

Figure 34:
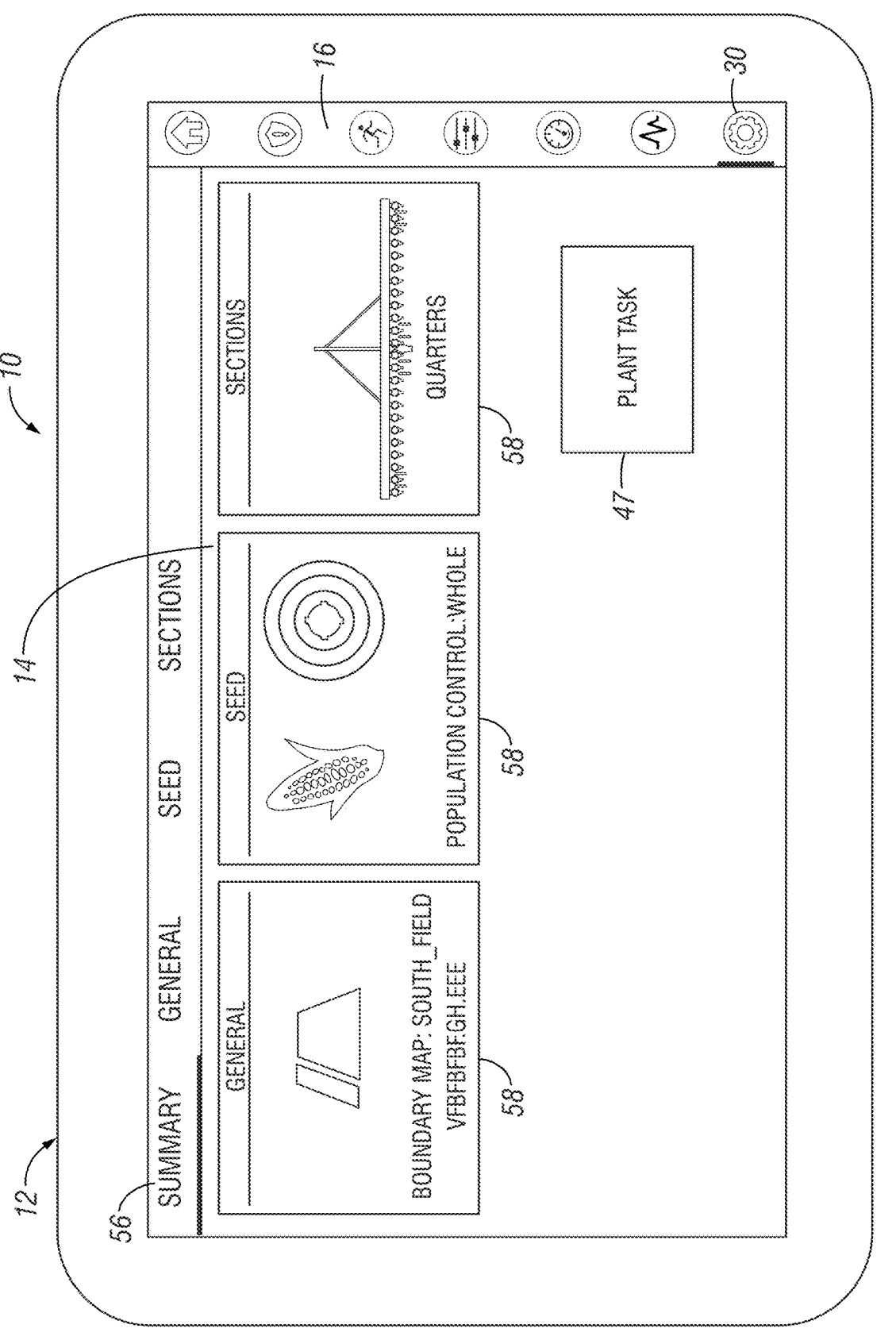
FIG. 34 is an exemplary display showing a reports screen.

FIG. 34 is an exemplary display showing a reports screen 14 interacting with the reports button 36 as shown on the screen in FIG. 1. Pressing the reports button can provide a summary page with selections associated with the reports. The reports can be general summaries of the operations of the planter, can be general reports, can be seed reports, or can be section reports. For example, the general reports can provide reports related to the field to ensure that to report what sections of the field have been planted and by which type of seed. The seed selection can provide or show what type of seed is being planted by the planter and with what type of seed meter and/or disk. The sections control can provide information related to individual or groups of sections or row units. The general, seed, and sections buttons are subscreened within the reports screen to provide information to the planter. This will provide a quick access plan reporting to or needing help diagnosing the problem or furthering parts related to the planter and/or planter operations. A plan task button takes the form of an action button 47 in the screen 14 as well to provide yet an additional avenue for providing new selections. Any of the reports can be viewed on the display unit 10, communicated to another device for viewing at a later time or by another person, printed, stored, or otherwise saved. Previous reports can be accessed on the display unit 10 or by communicating to a different location to further aid the operations of the planter. This can include providing data that was previously stored in order to utilize the data to increase the yield of crop being planted. As the display unit can include wireless communication, the reports page can also bring up weather reports, field mapping results, the world wide web, or even show movies, videos, photographs, or the like. The reports page can also include a path to an application store, wherein the display unit can wirelessly connect to the store to download additional applications.

Figure 35:
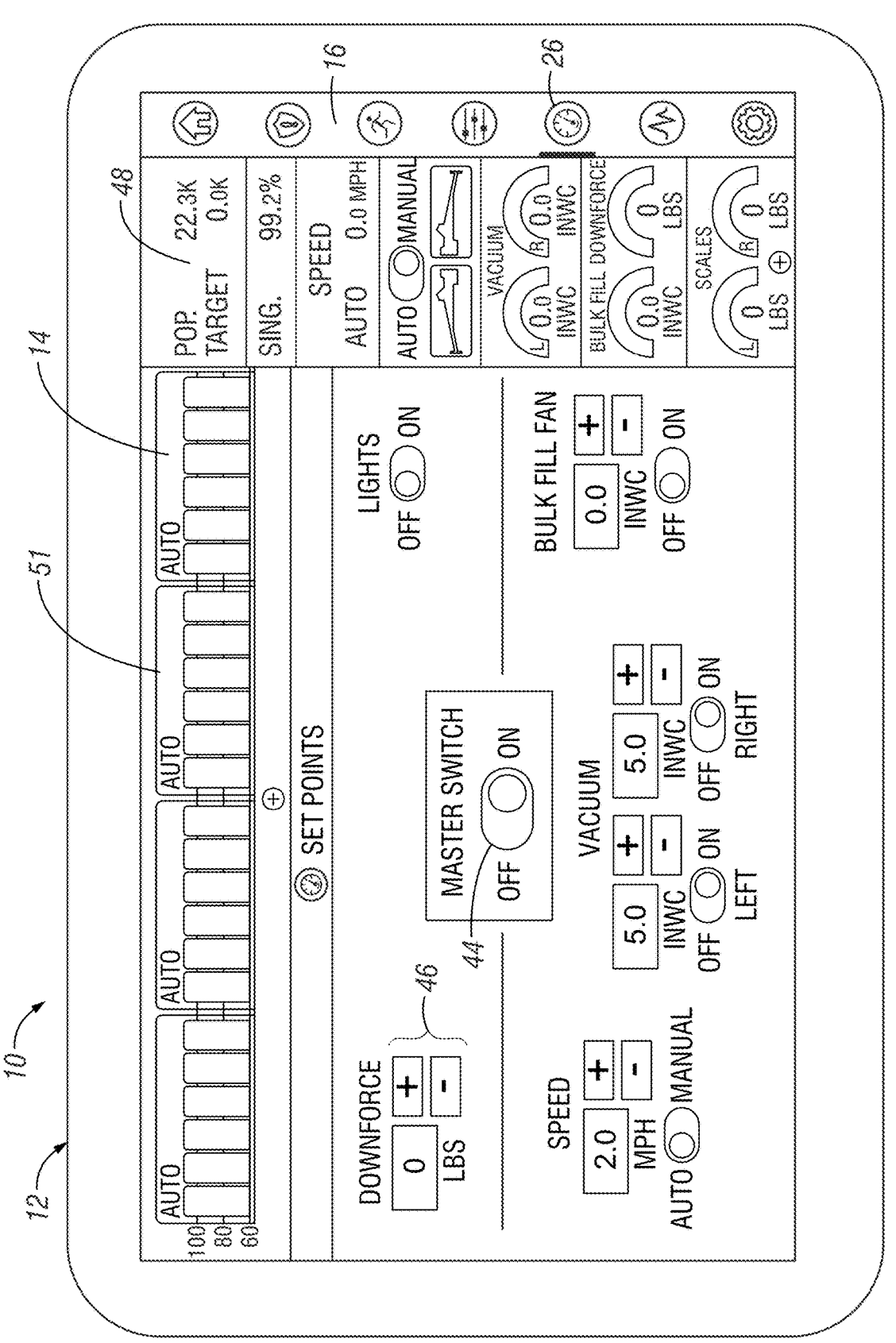
FIG. 35 is another exemplary view of a screen showing information related to sets points of the planter in communication with the display unit.

FIG. 35 is another exemplary view of a screen 14 showing information related to sets points of the planter in communication with the display unit 10. As shown and disclosed previously herein with respect to FIG. 3, the screen 14 in FIG. 35 shows similar graphical outputs, as well as providing different types of inputs for operating the planter in communication with the display unit 10. This includes use of toggle buttons 44 and increment buttons 46 for setting in or changing any of the operation perimeters of the associated planter. In addition, the expandable subscreens 48 are different than that shown in FIG. 3 show the population subscreen in an unexpanded view and further including a speed subscreen to provide yet additional information related to the speed of travel of the tractor and/or planter through a field.

Figure 36:
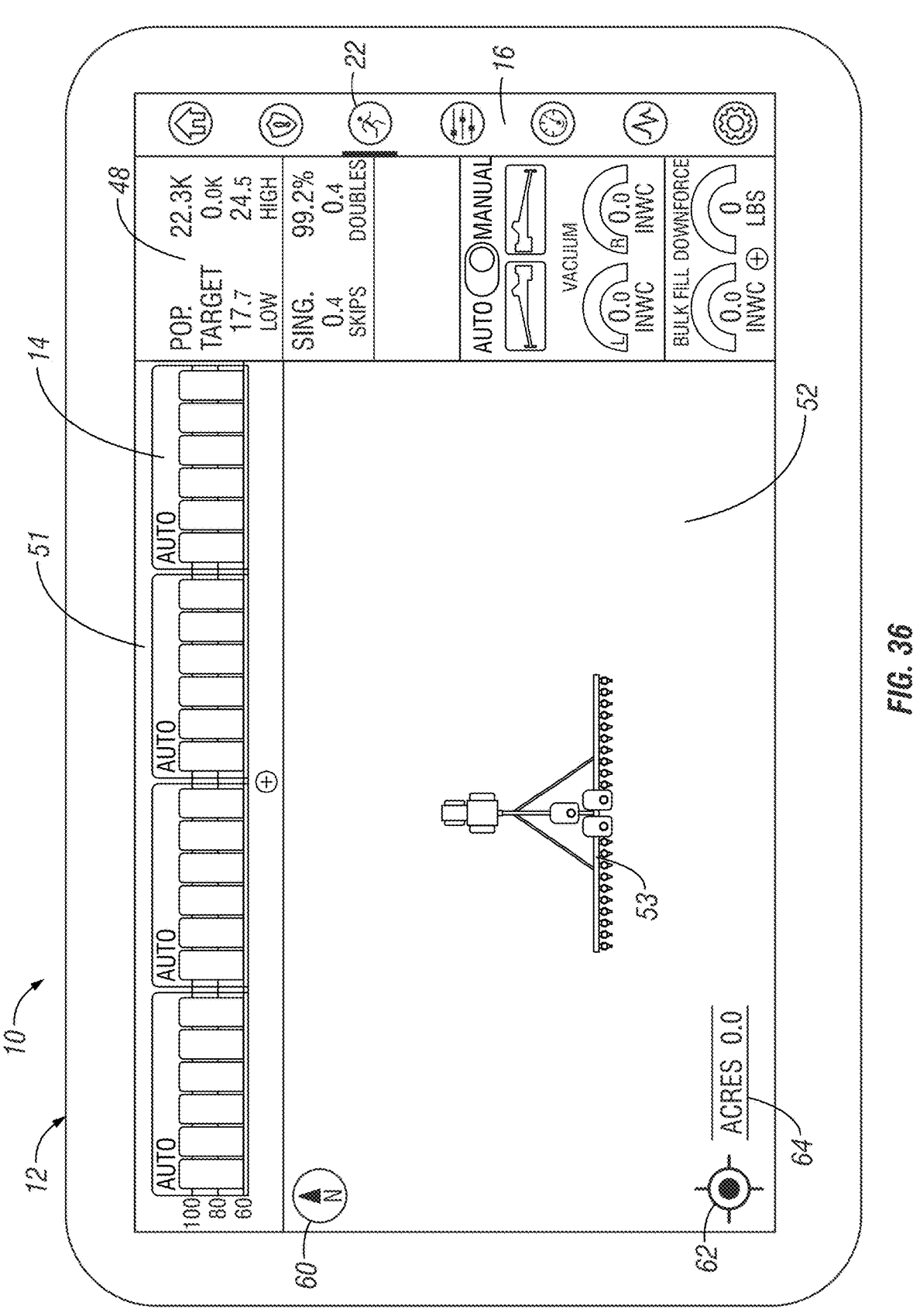
FIGS. 36-37 are exemplary views of run screens.

FIG. 36 is yet another exemplary view of a screen similar to that shown in FIG. 16 and including different information displayed on the screen 14. For example, the row unit sections 51 have taken a different form in FIG. 10 and do not include the selections between of the toggle switches of FIG. 3. The row unit sections 51 in FIG. 36 may be of the form showing how full each of the row units are with a type of seed. Still further, in FIG. 36, the field view 52 showing the implement 53 in the field 52 includes additional information in addition to the distance marker 64. The field view 52 also includes a compass rose 60 indicating the direct travel of the planter and tow vehicle as they move through the field. The compass row 60 can take different forms, such as showing the direction of travel, or to maintain a direction, such as north to give an indication of the operator the direction of travel. In addition, a home or reset button 62 is shown in the bottom left corner of the screen 14 in FIG. 36. The home button 62 can re-center the implement 53 in the screen and provide a short cut to resetting the view of the implement 53 in the field 52.

Furthermore, the row unit sections 51 can provide additional data, such as by showing multi-hybrid or split population information. This can include showing which type of seed has been delivered to each row unit and which is being planted by each row unit. For example, the row unit may include a single seed meter and that receives different types of seed based on the hybrid being planted, and this can be shown via the color of the seed within the row unit sections 51. Still further, if a multi-hybrid meters are included at each row unit, the graphics can show which of the hybrids associated with a type of meter is being planted in the field in that the particular locations as well.

Figure 37:
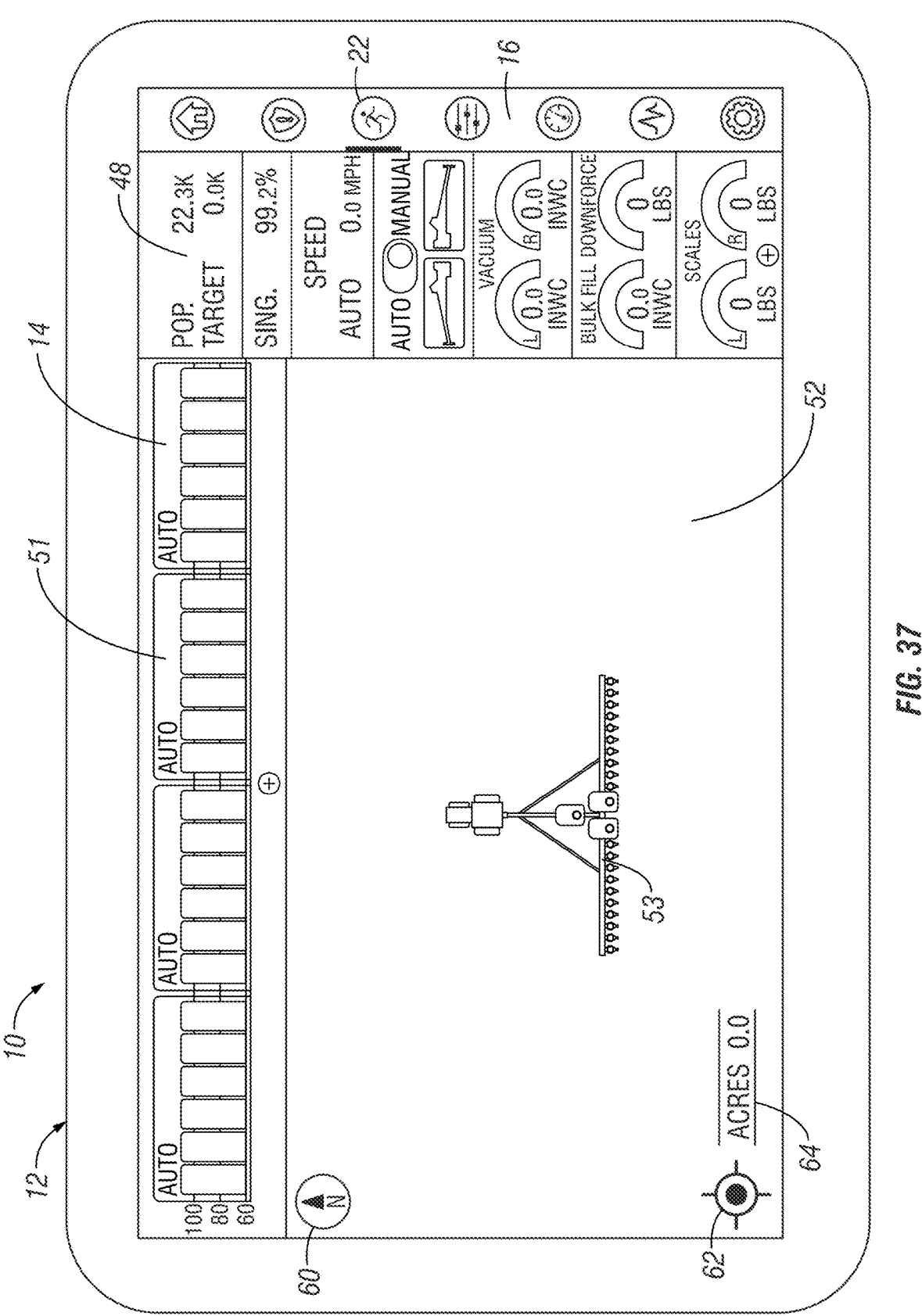

FIG. 37 is similar to FIG. 36. However, as shown in FIG. 37, the expandable subscreens 48 have been changed. The addition of the speed subscreen 48 has been included in FIG. 37 and the population insulation subscreens 48 in FIG. 10 have been unexpanded. Therefore, the screen 14 in FIG. 37 shows yet additional information which can be utilized by the operator.

Figure 38:
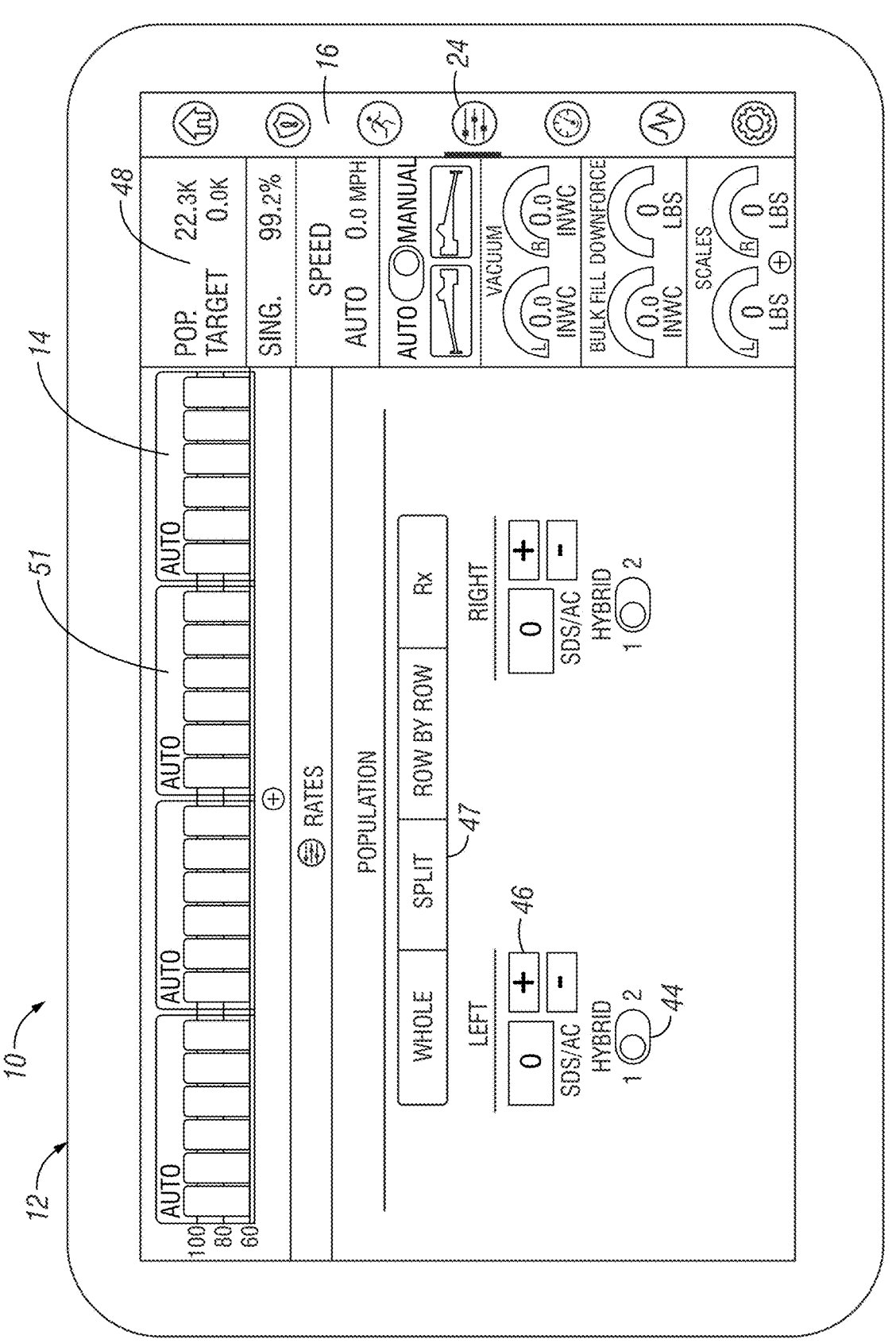
FIG. 38 is yet another exemplary screen showing additional information associated with the rates of planting.

FIG. 38 is yet another exemplary screen 14 showing additional information associated with the rates of planting. The rates button 24 indicate that the rates can be set, such as via toggle buttons 44 and increment buttons 46. Such as screen can be associated with the multi-hybrid planting wherein the user can select which hybrid is to be planted by the sections or individual row units themselves and can also indicate the population of the planting of the individual hybrids. This can be selected on a row unit by row unit basis or can be sectionalized via section row units 51 as shown on the screen 14.

Figure 39:
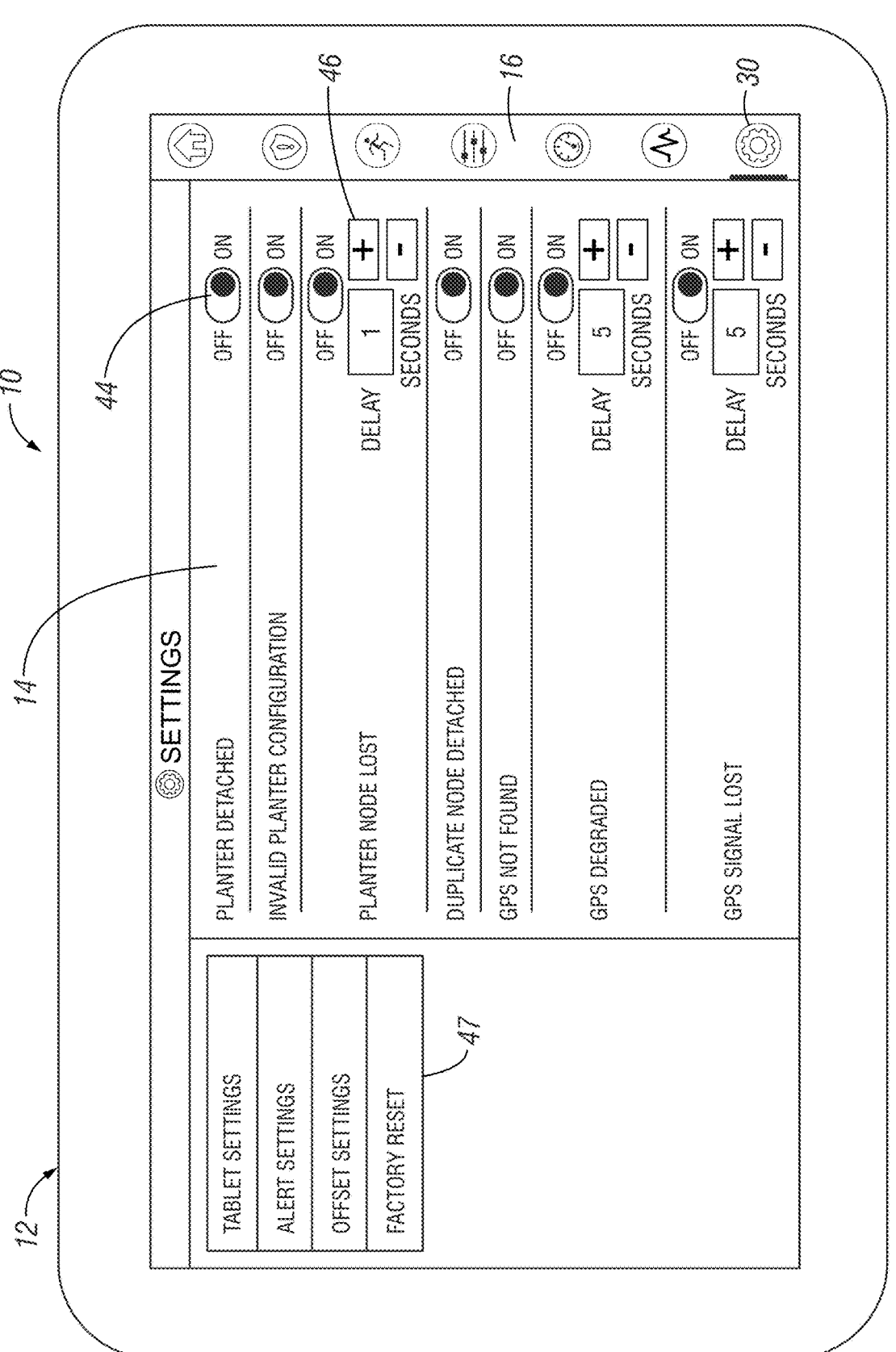
FIG. 39-41 are exemplary views of screens showing alert settings.

FIG. 39 is exemplary view of a screen 14 showing alert settings 30. The alert settings include toggle switches 44 and incremental switches 16. As mentioned, the alert screens can be tiered such that when an alert is noticed or notified via the display unit 10, the alert can be snoozed or otherwise delayed for a later time. The settings can be chosen to be on or off on the screen 14 as is shown in FIG. 39. In addition, the snooze can be set for determining the reminder time for reminding the operator of such alert. For example, the planter node lost option is set to on in FIG. 39 and set to a delay of one second. Therefore, when the user selects snooze when the alert is provided, there will be a delay of one second before the alert is reactivated or reshown on the screen to remind the operator of such alert. The other alerts as shown in FIG. 39 can be set as shown as well.

Figure 40:
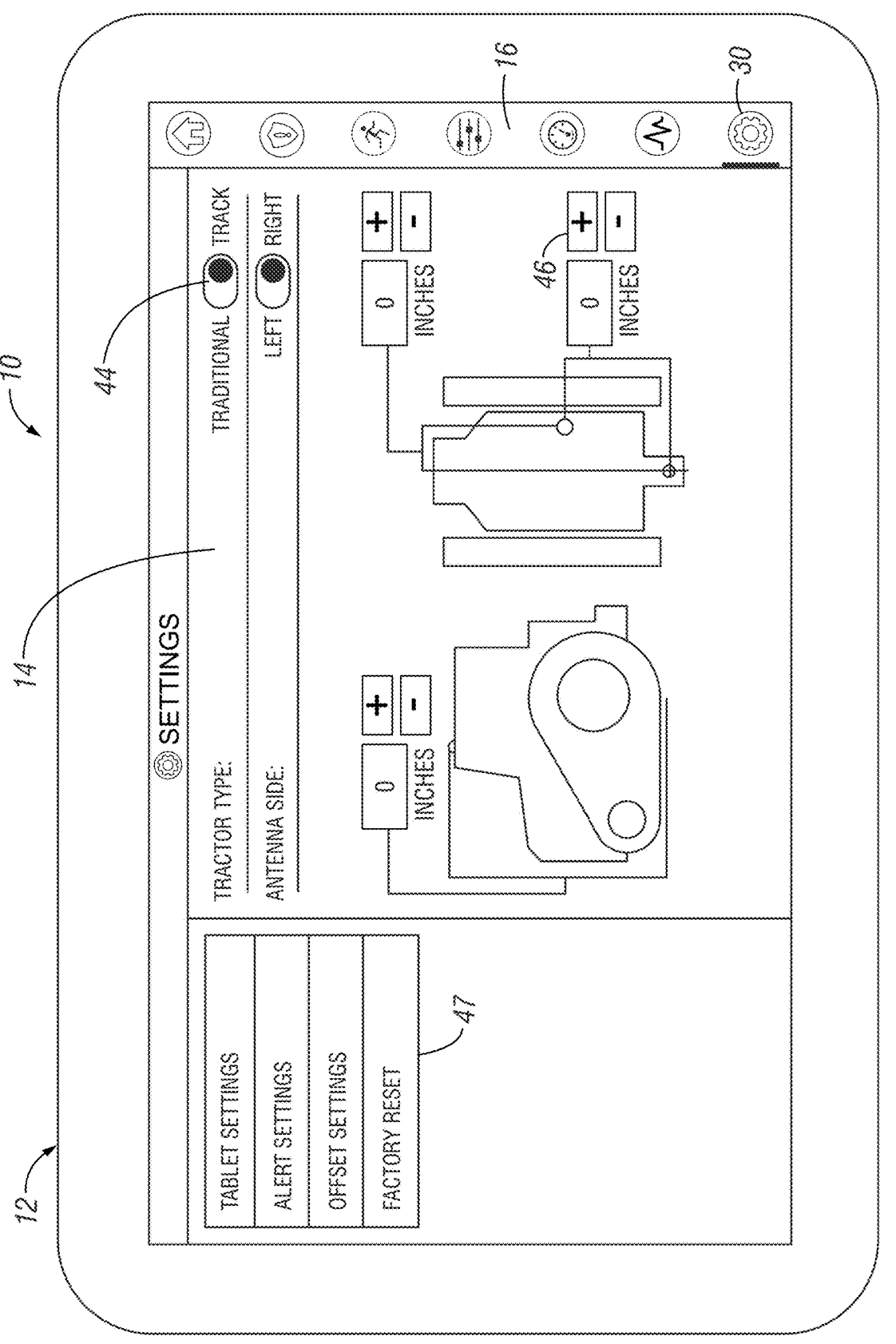

FIG. 40 is a settings screen 14 for offset settings of the tow vehicle or tractor. This includes a number of toggle settings 44 in increment settings 46. Thus, the offset settings for the tractor towing the planter can be set via the settings screen, which will communicate to the tractor to said settings for operation of the planter. The screen also allows for the personalization of the tractor, such as by setting tracks vs. wheels, and the antenna side.

Figure 41:
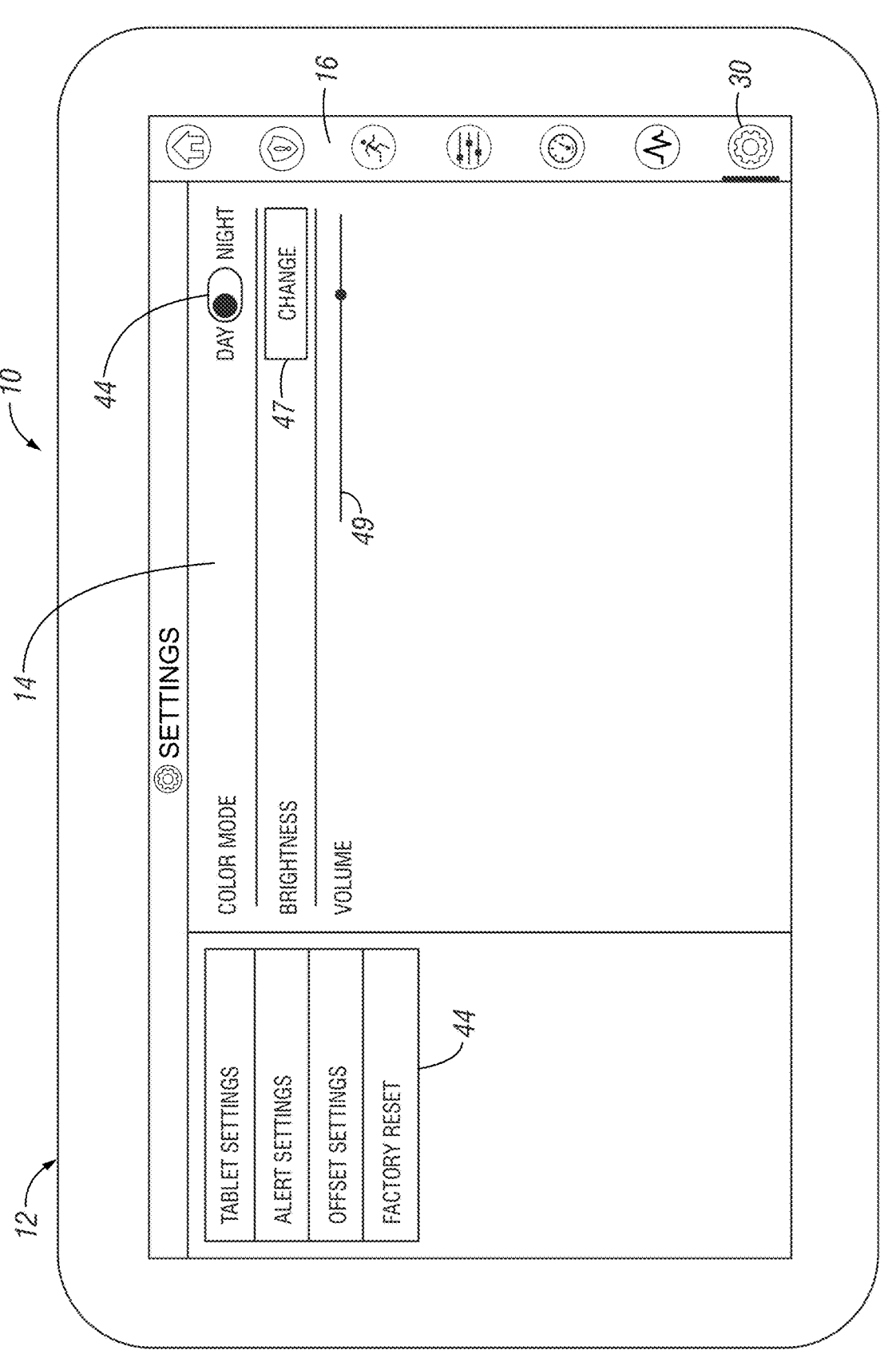

FIG. 41 is a setting screen 14 showing tablet settings once again as previously shown and described herein. This can include changing the screen to the night setting, which is shown in FIG. 42, wherein the colors have been inverted to allow for easier viewing of the screen at night time. Additional aspects include a slide bar 49 for changing the volume along a spectrum, and a button 47 for changing the brightness.

The display unit 10 as shown includes numerous alternatives not explicitly described. This can include one or more antennas for providing the wireless communication. Still further, it is contemplated that a camera (either or both of a still camera and a video camera) can be incorporated into the housing 12. The camera can acquire additional data that can be stored or transmitted via the display unit. A headphone connection, such as a headphone jack, can also be included in the housing to allow for speakers or other auditory devices to be connected to the unit 10.

The unit 10 according to the aspects of the present disclosure may also include components such as an intelligent control and communication components. Examples of such intelligent control units may be tablets, telephones, handheld devices, laptops, user displays, or generally any other computing device capable of allowing input, providing options, and showing output of electronic functions. Still further examples include a microprocessor, a microcontroller, or another suitable programmable device) and a memory. The controller also can include other components and can be implemented partially or entirely on a semiconductor (e.g., a field-programmable gate array ("FPGA")) chip, such as a chip developed through a register transfer level ("RTL") design process. The memory includes, in some embodiments, a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices.

A communications module can be included with the display unit and can be configured to connect to and communicate with another device, such as a computer, tablet, server, or other computing device. This could allow the display unit to provide data or other information (e.g., warnings, status, notices, etc.) associated with the unit to a remote location of the additional device to allow the real-time information and stored information for the unit (and therefore, planter). The information could be used to determine issues, forecast, or otherwise track information related to the unit and/or planter. The communication could also be in the form of inputs such that the communication could include a command to the unit or planter from a remote location.

In some embodiments, the display unit includes a first communications module for communicating with a secondary device (other display unit, device, or remote controller), and/or a second communications module for communicating with a central location (server, computer, or other master controller). For sake of simplicity, the term "communications module" herein applies to one or more communications modules individually or collectively operable to communicate with both the display unit and the central location.

The communications module communicates with the central location through the network. In some embodiments, the network is, by way of example only, a wide area network ("WAN") (e.g., a global positioning system ("GPS"), a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.), although other network types are possible and contemplated herein. In certain embodiments, the network is a GSM or other WAM which is operable to allow communication between the communications module and the central location during moments of low-quality connections, such as but not limited to when the display unit is in the middle of a field.

The network can be a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network by the communications module or the display unit can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The connections between the communications module and the network are wireless to enable freedom of movement and operation of the mobile cleaning machine without being physically tethered to a computer or other external processing device to facilitate such communications. Although such a modality of communications is preferred for at least this reason, it is contemplated that the connections between the communications module and the network can instead be a wired connection (e.g., a docking station for the communications module, a communications cable releasably connecting the communications module and a computer or other external processing device, or other communications interface hardware), or a combination of wireless and wired connections. Similarly, the connections between the display unit and the network or the network communications module are wired connections, wireless connections, or a combination of wireless and wired connections in any of the forms just described. In some embodiments, the display unit or communications module includes one or more communications ports (e.g., Ethernet, serial advanced technology attachment ("SATA"), universal serial bus ("USB"), integrated drive electronics ("IDE"), etc.) for transferring, receiving, or storing data.

The communications module can be powered by a dedicated power source, such as a battery, battery pack, or wired power (e.g., AC power socket or other power source). In some aspects of the invention, the communications module can be powered by the same power supply as that of the display unit, such as by battery or by wired power. Still further, it is contemplated that the communications module can be powered wirelessly or by power over ethernet.

The central location can include a centrally located computer, a network of computers, or one or more centrally located servers. The central location can be adapted to store, interpret, and communicate data from one or more display units 10, and can also interpret the data and communicate the interpreted data to a user.

Therefore, a display unit has been shown and described, as will be understood, various changes are contemplated via the display unit including, the types of input and the responses thereto. It is contemplated that the such changes which are obvious to that disclosed therein are to be included as part of the present disclosure.

What is claimed is:

1. A display unit for communication and/or control of an agricultural implement, the display unit comprising:
 a housing;
 a screen operatively connected to the housing, said screen being interactive based upon one or more inputs;
 a processing unit operatively connected to the housing; and
 a computer readable memory configured to store instructions to determine an alert associated with one or more operations of the agricultural implement;
 wherein the display unit provides data associated with the one or more operations of the agricultural implement and the screen shows input selections stored on the processing unit to alter the one or more operations or settings of the agricultural implement;
 wherein the display unit is adapted to be able to display the determined alert along with a date and/or time indicating when the alert was determined;
 wherein the display unit includes a button for simultaneously resetting a plurality of alerts pertaining to at least two different types of operations of the one or more operations of the agricultural implement;
 wherein the display unit enables a user to define custom alert thresholds;
 wherein the one or more operations that can be altered includes an ability to monitor and select on the display unit individual row units of the agricultural implement.

2. The display unit of claim 1, wherein determining the alert associated with the one or more operations of the agricultural implement comprises categorizing the alert into one of a plurality of tiered alerts based on the alert's severity.

3. The display unit of claim 2, wherein the plurality of tiered alerts comprises a first-tier alert, a second-tier alert, and a third-tier alert.

4. The display unit of claim 3, wherein the first-tier alert comprises a pop up or pop out subscreen that covers only a portion of the screen.

5. The display unit of claim 4, wherein the pop up or pop out subscreen does not require an input to go away.

6. The display unit of claim 4, wherein the pop up or pop out subscreen requires an input from the user to go away.

7. The display unit of claim 3, wherein the second-tier alert comprises a pop up or pop out subscreen that covers substantially all of the screen.

8. The display unit of claim 7, wherein the pop up or pop out subscreen of the second-tier alert will only go away with an input from the user.

9. The display unit of claim 3, wherein the third-tier alert comprises a change to substantially the entirety of the screen.

10. The display unit of claim 9, wherein the third-tier alert stops an operation of the agricultural implement until the alert has been handled.

11. A method of displaying alert information on a display unit for an agricultural implement, the method comprising:
 determining an operation of at least one component of the agricultural implement;
 comparing the operation of the at least one component of the agricultural implement with a desired operation based, at least in part, on one input; and
 upon detection of an unacceptable operation, displaying, via the display unit, one of a plurality of alerts, wherein the one of the plurality of alerts is categorized into a tier and the tier designating a manner of the displayed one of the plurality of alerts on the display unit;
 wherein the display unit is adapted to be able to display each alert of the plurality of alerts such that each alert of the plurality of alerts is accompanied by an icon that correlates with the tier of each alert;
 wherein the display unit includes a button for simultaneously resetting each alert of the plurality of alerts wherein the plurality of alerts pertains to at least two different types of operations of the agricultural implement;
 wherein the display unit enables a user to define custom alert thresholds;
 wherein the operation can be determined based on monitoring and selecting on the display unit an individual row unit of the agricultural implement.

12. The method of claim 11, wherein the tier comprises a first tier alert, a second tier alert, and a third tier alert.

13. The method of claim 12, further comprising displaying the first tiered alert in a subscreen sized less than a screen of the display unit.

14. The method of claim 13, further comprising removing the subscreen from the screen after a preset amount of time and without input from the user.

15. The method of claim 13, further comprising displaying the second tiered alert in a subscreen sized approximately a size of the screen.

16. The method of claim 15, further comprising maintaining the subscreen until the user provides an input to the display unit.

17. The method of claim 15, further comprising displaying the third tiered alert on the screen and stopping an operation of the agricultural implement until an issue associated with the third tiered alert is fixed.

18. A display unit for an agricultural implement, comprising:

a computer readable memory configured to store instructions to determine an alert associated with one or more operations of the agricultural implement;

a touchscreen including a plurality of inputs;

said plurality of inputs including:

a) at least one toggle switch operated by touch;

b) at least one incremental button to incrementally adjust an amount; and c) at least one action button for selecting a function or altering content displayed on the touchscreen based upon selection of the at least one action button;

wherein at least a portion of the touchscreen of the display unit comprises a real-life depiction of the agricultural implement;

wherein the display unit is adapted to be able to display the determined alert along with a date and/or time indicating when the alert was determined; and wherein the display unit includes a button for simultaneously resetting a plurality of alerts pertaining to at least two different types of operations of the one or more operations of the agricultural implement;

wherein the display unit enables a user to define custom alert thresholds;

wherein an individual row unit of the agricultural implement can be monitored and selected on the touchscreen.

19. The display unit of claim 18, wherein the real-life depiction of the agricultural implement is customizable.

\*  \*  \*  \*  \*